United States Patent
Hao et al.

(10) Patent No.: US 12,554,044 B2
(45) Date of Patent: Feb. 17, 2026

(54) LARGE-APERTURE ACHROMATIC METALENS, METALENS SYSTEM, AND OPTICAL SYSTEM

(71) Applicant: SHENZHEN METALENX TECHNOLOGY CO., LTD., Bao'an District Shenzhen (CN)

(72) Inventors: Chenglong Hao, Guangdong (CN); Fengze Tan, Guangdong (CN); Jian Zhu, Bao'an District Shenzhen (CN)

(73) Assignee: SHENZHEN METALENX TECHNOLOGY CO., LTD., Guangdong (CN)

( * ) Notice: Subject to any disclaimer, the term of this patent is extended or adjusted under 35 U.S.C. 154(b) by 570 days.

(21) Appl. No.: 18/004,411

(22) PCT Filed: Jul. 5, 2021

(86) PCT No.: PCT/CN2021/104460
§ 371 (c)(1),
(2) Date: Jan. 5, 2023

(87) PCT Pub. No.: WO2022/007738
PCT Pub. Date: Jan. 13, 2022

(65) Prior Publication Data
US 2023/0280499 A1 Sep. 7, 2023

(30) Foreign Application Priority Data
Jul. 7, 2020 (CN) .......................... 202010647972.5

(51) Int. Cl.
*G02B 1/00* (2006.01)
(52) U.S. Cl.
CPC .................................. *G02B 1/002* (2013.01)

(58) Field of Classification Search
CPC ......... G02B 1/002; G02B 1/005; G02B 1/007
See application file for complete search history.

(56) References Cited

U.S. PATENT DOCUMENTS 11,774,635 B2 * 10/2023 Li .......................... G02B 1/002
359/722
2016/0306079 A1 10/2016 Arbabi et al.
(Continued)

FOREIGN PATENT DOCUMENTS

| CN | 108291983 A | 7/2018 |
| CN | 109085667 A | 12/2018 |

(Continued)

OTHER PUBLICATIONS

Want et al. Planar metalenses in the mid-infrared, Aug. 30, 2019, (Year: 2019).*
Zhou et al. Broadband Achromatic Metalens in the Midinfrared Range, Feb. 26, 2019 (Year: 2019).*
(Continued)

*Primary Examiner* — Ephrem Z Mebrahtu
(74) *Attorney, Agent, or Firm* — Brooks Kushman P.C.

(57) ABSTRACT

Disclosed are a large-aperture achromatic metalens, a metalens system, and an optical system. The large-aperture metalens include: a substrate, which permits transmission of light of different wave bands, including visible light and infrared light; and a plurality of unit cells disposed in an array on a surface of the substrate. A center of each unit cell or each of the center and vertexes of each unit cell is provided with one nanostructure. A metalens surface is the surface of the substrate having the plurality of unit cells and is divided into a plurality of concentric circular regions in a radial direction, and for each circular region, incident broadband light is able to focus without chromatic aberration.

18 Claims, 23 Drawing Sheets

(56) References Cited

U.S. PATENT DOCUMENTS

| | | | |
|---|---|---|---|
| 2018/0022457 A1 | 1/2018 | Papke et al. | |
| 2018/0216797 A1* | 8/2018 | Khorasaninejad | B82Y 40/00 |
| 2018/0217395 A1* | 8/2018 | Lin | G02B 27/4272 |
| 2019/0025464 A1* | 1/2019 | Czaplewski | G02B 3/08 |
| 2019/0154877 A1* | 5/2019 | Capasso | G02B 5/18 |
| 2020/0409142 A1* | 12/2020 | Feng | G02B 7/021 |
| 2021/0103075 A1* | 4/2021 | Park | G02B 5/126 |
| 2021/0231909 A1* | 7/2021 | Colburn | G02B 7/10 |

FOREIGN PATENT DOCUMENTS

| | | | |
|---|---|---|---|
| CN | 109856704 | A | 6/2019 |
| CN | 110376665 | A | 10/2019 |
| CN | 111257975 | A | 6/2020 |
| CN | 213903843 | U | 8/2021 |
| JP | 2018537804 | A | 12/2018 |
| JP | 2019516128 | A | 6/2019 |
| WO | 2018175874 | A1 | 9/2018 |

OTHER PUBLICATIONS

International Search Report issued on Sep. 16, 2021 for the corresponding International Application No. PCT/CN2021/104460, 6 pgs.
First Chinese Office Action for CN patent No. 202010647972.5, dated May 10, 2022, 6 pgs.
Extended European Search Report Corresponding to Application No. 21837032.8, mailed Dec. 11, 2024, 9 pgs.
First Office Action issued in corresponding Japanese Application No. 2022-581020 dated Nov. 21, 2023, 5 pgs.
Second Office Action issued in corresponding Japanese Application No. 2022-581020 dated Jun. 4, 2024, 4 pgs.
Shrestha, S. et al., "Broadband achromatic dielectric metalenses", Light: Science & Applications, Nov. 7, 2018, vol. 7, No. 1, 11 pgs.
Balli, F. et al., "A Hybrid Achromatic Metalens", arxiv.org, Cornell University Library, 201 Olin Library Cornell University Ithaca, NY14853, Sep. 17, 2019, 20 pgs.
First Office Action issued in corresponding Korean Application No. 10-2023-7000521 dated Dec. 2, 2024, 6 pgs.

* cited by examiner

LARGE-APERTURE ACHROMATIC METALENS, METALENS SYSTEM, AND OPTICAL SYSTEM

CROSS-REFERENCE TO RELATED APPLICATIONS

This application is the U.S. national phase of PCT Application No. PCT/CN2021/104460 filed Jul. 5, 2021, which claims foreign priority benefits under 35 U.S.C. 119(a)-(d) to priority to CN application Serial No. 202010647972.5 filed Jul. 7, 2020, the disclosures of which are hereby incorporated in their its entirety by reference herein.

FIELD

The present disclosure relates to the field of lenses, in particular to a large-aperture achromatic metalens, an achromatic and aplanatic metalens system, and an optical system.

BACKGROUND

An optical lens is a basic component playing a crucial role in the scientific and industrial fields such as imaging, precision measurement and optical communication. A conventional optical lens is manufactured by complex procedures, for example, by successively subjecting material cutting, surface polishing, fine polishing and film coating. A multi-lens optical system formed by conventional optical lenses normally contains multiple refracting lenses or reflecting lenses to realize a specific imaging application, such as infinite imaging, image projection and microscopic imaging. In general, a conventional lens group having refracting lenses or reflecting lenses has disadvantages of large size and heavy weight. Metalenses have emerged as a new technique and facilitate miniaturization of optical lenses, overcoming large size and high weight of conventional lenses. However, existing metalens also have a series of problems, such as polarization sensitivity, low broadband transmittance, difficulty in satisfying large aperture and chromatic aberration correction at the same time.

In addition, in order to facilitate understanding of the present disclosure, terms in the present disclosure are explained as follows. Group delay refers to a rate of change of a total phase shift through a device or a transmission medium relative to an angular frequency, that is, $d\Phi/d\omega$, where $\Phi$ represents the total phase shift and $\omega$ represents an angular frequency and is equal to $2\pi f$, where f represents a frequency.

SUMMARY

In view of the above technical problem, a large-aperture achromatic metalens, an achromatic and aplanatic metalens system, and an optical system are provided according to embodiments of the present disclosure.

A large-aperture achromatic metalens is provided according to a first aspect of the embodiments of the present disclosure. The metalens includes: a substrate and a plurality of unit cells. The substrate is configured to transmit light of different wavebands, where the light of different wavebands includes visible light and infrared light. The unit cells are arranged in an array on one surface of the substrate. A center of each unit cell is provided with one nanostructure, or each of the center and vertexes of each unit cell is provided with one nanostructure. The nanostructures are symmetrically arranged with respect to a first axis and a second axis, and the nanostructures on the metalens being divided along the first axis and the second axis form identical nanostructures, where the first axis is perpendicular to the second axis, and the first axis and the second axis are both perpendicular to a longitudinal direction of the nanostructure. A metalens surface is a surface of the substrate having the unit cells, the metalens surface is divided into a plurality of concentric circular regions along a radial direction of the metalens surface, and for each circular region, incident broadband light is able to focus without chromatic aberration.

In an embodiment, the nanostructures are nanopillars, and the nanopillars include one of a positive nanocylinder, a negative nanocylinder, a hollow nanopillar, a square nanopillar, and a topological nanopillar. Preferably, the nanopillars include a negative square nanopillar, a negative hollow square nanopillar or a hollow square nanopillar.

In an embodiment, the optical phase of each of the nanopillars is related to a height, a shape of a cross section and a material of each of the nanopillars. The cross section is parallel to the substrate. The nanostructures are made of one or more of the following materials: photoresist, quartz glass, silicon nitride, titanium oxide, aluminium oxide, crystalline silicon, amorphous silicon, gallium nitride, crystalline germanium, selenium sulfide, zinc sulfide and sulphur-based glass.

In an embodiment, the circular regions on the metalens surface are configured to allow for interference enhancement of a central wavelength and two edge wavelengths of an incident light at a focal plane of the metalens.

Preferably, the circular regions on the metalens surface are periodically arranged according to an effective refractive index of the large-aperture achromatic metalens along the radial direction; the effective refractive index is between a refractive index of a material of the nanostructures and a refractive index of air.

Preferably, the circular regions on the metalens surface are periodically arranged according to a group delay of the large-aperture achromatic metalens along the radial direction; a period of the group delay is determined by subtracting a minimum group delay from a maximum group delay in a nanostructure library; preferably, the incident broadband light is discretized into N characteristic wavelengths, and a sum of an absolute value of difference of a theoretical phase and a phase of nanostructures on the metalens surface along a radial direction at a radius $r_0$ at each of the N characteristic wavelengths is minimum, which is optimized according to the following equation:

$$\min \sum_{i=1}^{N} |\varphi_{nano\_structure}(r_0, \lambda_i) - \varphi_{theory}(r_0, \lambda_i)|$$

where, $\varphi_{nano\_structure}(r_0, \lambda_i)$ represents the phase of the nanostructures on the metalens surface along the radial direction at the radius $r_0$ at a characteristic wavelength $\lambda_i$, i=1, 2, ..., N; $\varphi_{theory}(r_0, \lambda_i)$ represents the theoretical phase of the nanostructures on the metalens surface along the radial direction at the radius $r_0$ at the characteristic wavelength $\lambda_i$.

In an embodiment, the metalens surface is coated with an antireflection film corresponding to the nanostructures, and another surface of the substrate is coated with an antireflection film corresponding to a material of the substrate. For the correspondence mentioned here, reference may be made to CN 202022010432.4 (ANTIREFLECTION FILM ON FAR-INFRARED SILICON-BASED METALENS AND METALENS) of the Applicant, and the entire contents of CN 202022010432.4 are incorporated herein by reference.

An achromatic and aplanatic metalens system is provided according to a second aspect of the embodiments of the present disclosure, which includes: a lens cone, and the large-aperture achromatic metalens according to any one of the above. The large-aperture achromatic metalens is arranged in the lens cone, an optical phase of the large-aperture achromatic metalens changes with a wavelength.

An optical system is provided according to a third aspect of the embodiments of the present disclosure. The optical system includes: a lens cone; and at least two metalenses according to the first aspect of the embodiments. Nanostructures of unit cells on the metalens surfaces of the at least two metalenses at the same radius are different from each other. The at least two metalenses are coaxially arranged in the lens cone, and an optical phase of each of the at least two metalenses changes with a wavelength, and one of the at least two metalenses is configured to correct an aberration of other metalenses at a wavelength.

In an embodiment, one of the at least two metalenses is configured to correct an aberration of other metalenses, and the aberration includes at least one of a spherical aberration, a coma aberration, astigmatism, field curvature, distortion, a positional aberration and a magnification aberration.

In an embodiment, the at least two metalenses includes a first metalens and a second metalens; an incident light sequentially passes through the first metalens and the second metalens; and the first metalens is configured to correct all aberrations of the second metalens.

In an embodiment, another surface of the substrate of the metalens is coated with a first antireflection film dedicated to a visible light band, and the metalens surface is coated with a second antireflection film dedicated to the visible light band. The substrate of the metalens is made of quartz glass; and/or the nanostructures of the metalens are made of one or more of silicon nitride, titanium oxide, gallium nitride, aluminum oxide and silicon dioxide.

In an embodiment, the first antireflection film dedicated to the visible light band matches with an effective refractive index of the quartz glass; and/or the second antireflection film dedicated to the visible light band matches with an effective refractive index of the nanostructures; and/or another surface of the substrate of the metalens is coated with a first antireflection film dedicated to an infrared light band, and the metalens surface is coated with a second antireflection film dedicated to the infrared light band; the first antireflection film dedicated to the infrared light band and the second antireflection film dedicated to the infrared light band both matches with an effective refractive index of crystalline silicon.

In an embodiment, the substrate and the nanostructures of the metalens are made of one or more of crystalline silicon, crystalline germanium, selenium sulfide, zinc sulfide, and sulfur-based glass.

It can be seen from the above technical solutions according to the embodiments of the present disclosure, the nanostructures on the metalens being divided along the first axis and the second axis form identical nanostructures, therefore, the metalens is insensitive to the polarization of the incident light. Compared with the conventional lens, the metalens is thinner in thickness and lighter in weight. On the other hand, the metalens surface of the present disclosure is divided into concentric circular regions along the radial direction, for each circular region, the incident broadband light is able to focus without chromatic aberration, and characteristic wavelengths are focused to the same focal point, so that the limit on effective refractive index/group delay of nanostructures in the existing achromatic metalens can be eliminated due to the use of the metalens of the present disclosure. Compared with the existing achromatic metalens, the metalens of the present disclosure can not only correct chromatic aberration, but also has a large-aperture of centimeter scale at the same time, which can be used for correcting an aberration of the existing metalenses, so as to obtain a higher image quality.

In addition, the metalens system of the present disclosure includes the metalens of the present disclosure that is arranged on the lens cone, and an optical phase of the metalens changes with a wavelength. The optical system of the present disclosure includes multiple metalenses of the present disclosure that are coaxially arranged in the lens cone and the optical system of the present disclosure is capable of broadband and wide-angle imaging. Compared with an optical system with existing metalenses, the optical system of the present disclosure can correct chromatic aberration while retaining the advantages of small size and light weight of the metalens, which can realize broadband, wide-angle and high-definition imaging.

It should be understood that, the foregoing general descriptions and the following detailed descriptions are merely for exemplary and explanatory purposes and are not intended to limit the present disclosure.

Figure 1A:
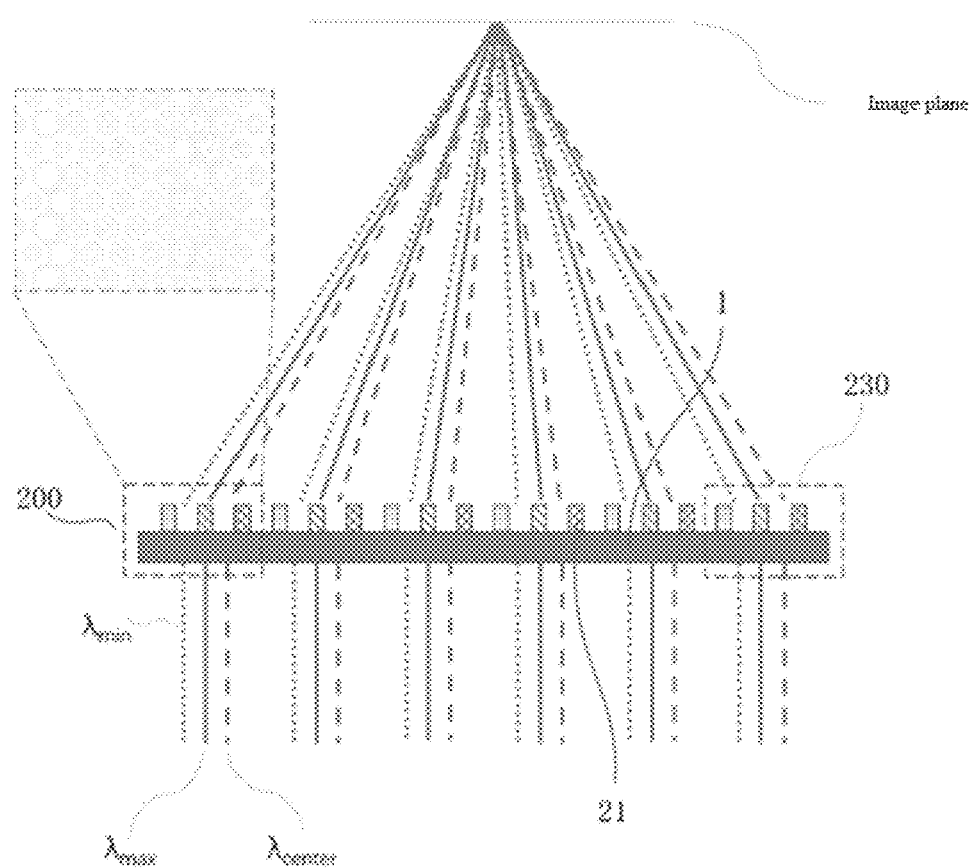
FIG. 1 is a schematic diagram showing focusing and a partial surface structure of a metalens according to an embodiment of the present disclosure.

Reference numbers in the drawings are listed as follows:

| | |
|---|---|
| 1 | substrate; |
| 2 | unit cell; |
| 21 | nanostructure; |
| 211 | positive nanopillar; |
| 212 | negative nanopillar; |
| 2121 | first column; |
| 2122 | first hollow part; |
| 213 | hollow nanopillar; |
| 2131 | second cylinder; |
| 2132 | second hollow part; |
| 214 | negative hollow nanopillar; |
| 2141 | second column; |
| 2412 | third hollow part; |
| 2143 | third cylinder; |
| 215 | square nanopillar; |
| 216 | negative square nanopillar; |
| 2161 | fourth column; |
| 2162 | fourth hollow part; |
| 217 | hollow square nanopillar; |
| 2171 | fifth column; |
| 2172 | fifth hollow part; |
| 218 | negative hollow square nanopillar; |
| 2181 | sixth column; |
| 2182 | sixth hollow part; |
| 2183 | seventh column; |
| 219 | topological nanopillar; |
| 200 | metalens; |
| 210 | first metalens; |
| 220 | second metalens; |
| 230 | third metalens; |

DETAILED DESCRIPTION OF THE EMBODIMENTS

Exemplary embodiments are described in detail herein, and examples thereof are shown in the drawings. When the following descriptions refer to the drawings, unless indicated otherwise, same numbers in different drawings represent the same or similar elements. The implementations described in the following exemplary embodiments do not represent all implementations that are consistent with the present disclosure. On the contrary, the implementations are merely examples of devices and methods consistent with those described in detail in the claims and some aspects of the present disclosure.

Terms used in the present disclosure are only used for describing specific embodiments rather than limiting the present disclosure. The terms "one", "said", and "the" in a singular form used in the present disclosure and the claims are intended to include a plural form unless other meanings are clearly indicated in the context. It should be understood that the terms "and/or" as used herein refer to and include any or all possible combinations of one or more associated listed items.

It should be understood that although the terms such as first, second and third may be used to describe various kinds of information in the present disclosure, such information should not be limited to these terms. The terms are only intended to distinguish the same type of information from each other. For example, first information may be referred as second information, similarly, the second information may be referred as the first information without departing from the scope of the present disclosure. Depending on the context, a word "if" as used herein may be interpreted as "in a case that" or "when" or "in response to a determination". The embodiments and features in the embodiments may be combined with each other without a conflict.

The optical system formed by multiple conventional optical lenses has some disadvantages, such as high requirements on assembly and alignment, decrease in light energy utilization due to using multiple lenses to correct aberration, large volume and heavy weight, and complexities of the whole system. Although a planar diffractive lens may reduce the volume and weight to a certain extent, wavelength-scaled segments within a cross section of the planar diffractive lens makes it difficult to realize accurate phase distribution, failing to meet the requirements of high resolution.

An optical metasurface is rapidly emerging and becomes a mainstream way in miniaturization and planarization in optics. The optical metasurface has been used to realize a conical lens, a blazed grating, a polarizer, a holographic dry plate, and a planar lens based on the metasurface. A metasurface with continuous changing of $2\pi$ phase makes the realization of a single-layered aplanat metalens. In addition, a dualside metalens is capable of correcting all monochromatic aberrations. However, due to the limits of processing technology, existing achromatic metalenses are difficult to have a large aperture and a large numerical aperture at once, which greatly limits the use of metalenses in optical imaging systems.

Nanostructures are provided according to an embodiment of the present disclosure. The nanostructures are symmetrically arranged with respect to a first axis and a second axis, and the nanostructures on the metalens being divided along the first axis and the second axis form identical nanostructures. The first axis is perpendicular to the second axis, and the first axis and the second axis are perpendicular to the longitudinal direction of the nanostructures. Optical phases of the nanostructures at different positions vary under different wavelengths, and the difference of the optical phases of the nanostructures determines optical phase distribution of the metalens at different wavelengths.

A metalens is further provided according to an embodiment of the present disclosure. The metalens includes a substrate and a plurality of unit cells. The substrate is configured to transmit light of different wavebands including visible light and infrared light. The unit cells are arranged in an array on one surface of the substrate. Each of the unit cells is regular hexagonal or square, a center of the unit cell is provided with one nanostructure, or each of the center and vertexes of the unit cell is provided with one nanostructure. The nanostructures are symmetrically arranged with respect to a first axis and a second axis. The nanostructures on the metalens being divided along the first axis and the second axis form identical nanostructures. The first axis is perpendicular to the second axis, and the first axis and the second axis are both perpendicular to a longitudinal direction of the nanostructures. The optical phases of the nanostructures at different positions are different at different wavelengths, so as to define the optical phase distribution of the metalens at different wavelengths. A metalens surface is a surface of the substrate having the unit cells, the metalens surface is divided into a plurality of concentric circular regions along a radial direction of the metalens surface, and for each of the circular regions, incident broadband light is able to focus without chromatic aberration. The metalens of the present disclosure has different optical phases at different wavelengths. The metalens surface is divided into concentric circular regions along the radial direction, and for each circular region, the incident broadband light is able to focus without chromatic aberration, and the circular regions on the metalens surface are configured to allow for interference enhancement of a central wavelength and two edge wavelengths of an incident light at a focal plane of the metalens, solving the difficulty in satisfying large aperture and large numerical aperture of the achromatic metalens at the same time.

An achromatic and aplanatic metalens system is further provided according to an embodiment of the present disclosure. The achromatic and aplanatic metalens system includes a lens cone, a lens and at least one metalens according to any one of the first aspect of the present disclosure. The metalens is arranged in the lens cone, and optical phases of the metalens are different at different wavelengths, so as to achieve focusing/divergence without chromatic aberration and spherical aberration. The metalens surface is coated with an antireflection film corresponding to the nanostructure, and another surface of the substrate is coated with an antireflection film corresponding to a material of the substrate.

An optical system is further provided according to an embodiment of the present disclosure. The optical system includes a lens cone and at least two metalenses according to any one of the first aspect of the present disclosure. The at least two metalenses have different nanostructures on unit cells of the metalens surfaces at a same radius. For example, nanostructures of unit cells on a metalens surface of one of two metalenses at a radius may be shaped as a nanocylinder, and nanostructures of unit cells on a metalens surface of the other one of the two metalenses at the same radius may be shaped as a square nanopillar. In some other embodiments, if the optical system includes a larger number of the metalenses, nanostructures on unit cells on metalens surfaces of the metalenses at the same radius may be partially identical to each other, where at least two of the metalenses are spaced apart from each other, the metalenses are coaxially arranged in the lens cone, the light phase of each of the metalenses changes with a wavelength, one of the metalenses is configured to correct aberration of the other metalenses at a corresponding wavelength. One of the metalenses of the optical system is configured to correct the aberrations of the other metalenses, the aberrations include at least one of a spherical aberration, a coma aberration, astigmatism, field curvature, distortion, a positional aberration and a magnification aberration. The achromatic metalens and the optical system including the same according to the present disclosure are able to correct all aberrations and realize broadband and wide-angle imaging. Compared with an optical system including existing metalenses, the optical system of the present disclosure corrects all aberrations while retaining the advantages of small size, light weight, and easy integration, realizing wide-angle, broadband and high-definition imaging.

Exemplary embodiments are described in detail below, and examples thereof are shown in the drawings.

First Embodiment

Nanostructures 21 are provided according to an embodiment of the present disclosure. The nanostructures 21 are arranged asymmetrically with respect to a first axis and a second axis. The nanostructures on the metalens being divided along the first axis and the second axis form identical nanostructures. Multiple nanostructure units obtained by cutting the nanostructure 21 along the first axis and the second axis are identical to each other. The first axis is perpendicular to the second axis, and the first axis and the second axis are perpendicular to the longitudinal direction of the nanostructures 21. Optical phases of the nanostructures 21 at different positions are different at different wavelengths, to define optical phase distribution of the metalens 200 at different wavelengths. Each nanostructure 21 is a nanopillar.

The nanostructures 21 may be in a nanopillar structure or in another structure symmetrically arranged with respect to a horizontal axis and a vertical axis. Next, description is made by taking the nanostructures 21 being a nanopillar as an example to explain. It should be understood that in a case that the nanostructures 21 are in another structure, the nanopillar in the following embodiment may be replaced with the other structure.

The nanopillar may be one of a positive nanocylinder, a negative nanocylinder, a positive nanopillar, a negative nanopillar, a hollow nanopillar, a negative hollow nanopillar, a square nanopillar, a negative square nanopillar, a hollow square nanopillar, a negative hollow square nanopillar, and a topological nanopillar. For example, in one metalens, the nanopillar may be one of the positive nanopillar, the negative nanopillar, the hollow nanopillar, the negative hollow nanopillar, the square nanopillar, the negative square nanopillar, the hollow square nanopillar, the negative hollow square nanopillar, and the topological nanopillar, which are convenient for processing.

In the embodiment of the present disclosure, the optical phase of the nanostructure 21 is related to a height of the nanopillar, a shape of a cross section of the nanopillar and a material of the nanopillar. The cross section of the nanopillar is parallel to the substrate 1. It is to be noted that the first axis and the second axis pass through a center of the whole nanostructures 21 and are parallel to a horizontal plane.

As shown in FIGS. 3A to 3I, a height of the nanopillar (that is, a height of the nanopillar in a z-direction) is H.

In a case that the overall structure formed by the nanostructures 21 is to transmit visible light, the height H of the nanopillar is greater than or equal to 300 nm and less than or equal to 1500 nm, an interval between adjacent nanopillars (that is, an interval between centers of the two adjacent nanopillars) is greater than or equal to 300 nm and less than or equal to 650 nm, and a minimum size of the nanostructures (that may be a diameter, a side length, and/or a minimum interval between two adjacent nanopillars, or the like) may be 40 nm. For example, the height H of the nanopillar is 300 nm, 400 nm, 500 nm, 600 nm, 700 nm, 800 nm, 900 nm, 1000 nm, 1100 nm, 1200 nm, 1300 nm, 1400 nm, 1500 nm, or the like. For example, the interval between adjacent nanopillars is 300 nm, 350 nm, 400 nm, 450 nm, 500 nm, 550 nm, 600 nm, 650 nm, or any other value within the range.

In a case that the overall structure formed by the nanostructures 21 is to transmit infrared light of wavebands of 8 μm to 12 μm, the height H of the nanopillar is greater than or equal to 5 μm and less than or equal to 50 μm, the interval between adjacent nanopillars is greater than or equal to 1.5 μm and less than or equal to 5 μm, and the minimum size of the nanostructures (that may be a diameter, a side length, and/or a minimum interval between two adjacent nanopillars, or the like) may be 40 nm. For example, the height H of the nanopillar is 5 μm, 10 μm, 15 μm, 20 μm, 25 μm, 30 μm, 35 μm, 40 μm, 45 μm, 50 μm or the like. For example, the interval between adjacent nanopillars is 1.5 μm, 2 μm, 2.5 μm, 3 μm, 3.5 μm, 4 μm, 4.5 μm, 5 μm, or any other value within the range.

Figure 3A:
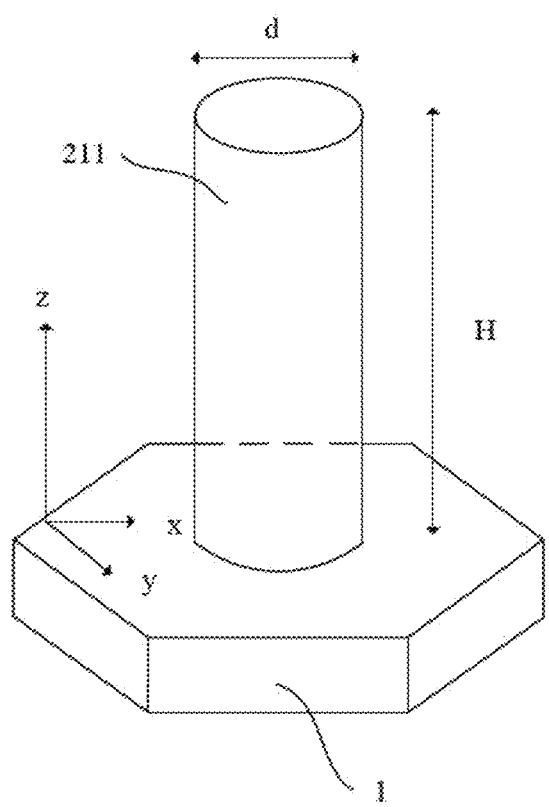
FIG. 3A is a schematic diagram of a positive nanopillar according to an embodiment of the present disclosure.

As shown in FIG. 3A, the positive nanopillar 211 may be a first cylinder. The first cylinder is solid. The positive nanopillar 211 has a cross-sectional diameter d on a x-y plane. The diameter d ranges from 40 nm to 400 nm. For example, the diameter d may be set as 40 nm, 50 nm, 150 nm, 200 nm, 250 nm, 300 nm, 350 nm, 400 nm or any value within the range.

Figure 3B:
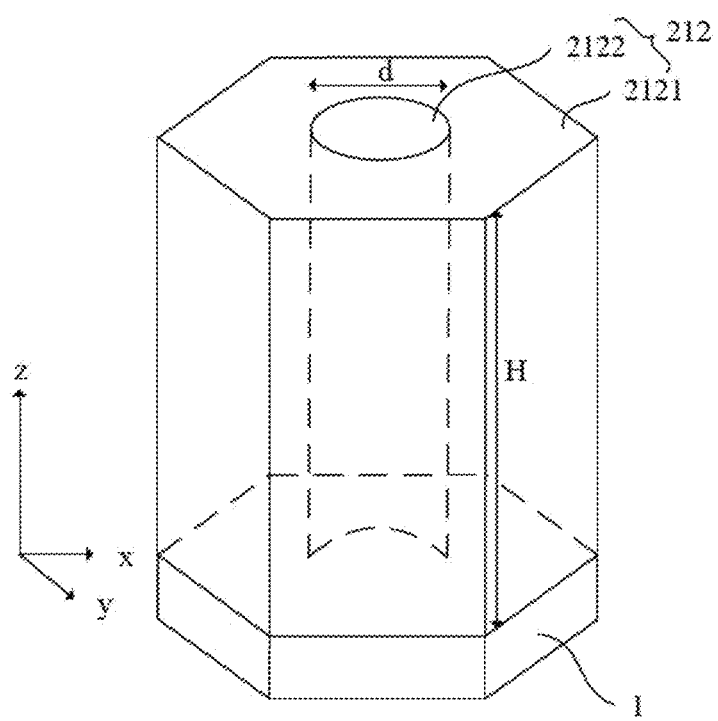
FIG. 3B is a schematic diagram of a negative nanopillar according to an embodiment of the present disclosure.

As shown in FIG. 3B, the negative nanopillar 212 may include a first column 2121. A shape of a cross section of the first column 2121 is the same as a shape of a unit cell 2. For example, in a case that the unit cell 2 is hexagonal, the cross section of the first column 2121 is hexagonal. In a case that the unit cell 2 is square, the cross section of the first column 2121 is square. In the embodiment, a size of the cross section of the first column 2121 is the same as a size of the unit cell 2. The first column 2121 is provided with a first hollow part 2122 which is cylindrical and extends from the top of the first column 2121 to the bottom of the first column 2121, and the first column 2121 is arranged coaxially with the first hollow part 2122. The negative nanopillar 212 has a cross-sectional diameter d on the x-y plane (that is, the cross section of the negative nanopillar 212). The diameter d ranges from 40 nm to 400 nm. For example, the diameter d may be set as 40 nm, 50 nm, 150 nm, 200 nm, 250 nm, 300 nm, 350 nm, 400 nm or any value within the range.

Figure 3C:
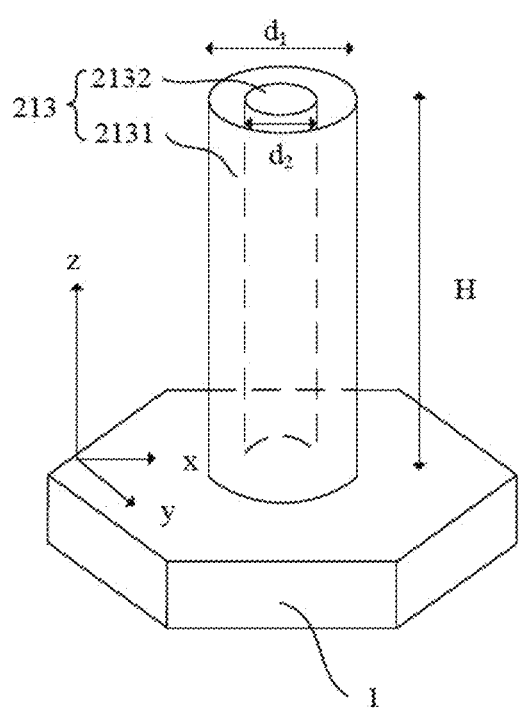
FIG. 3C is a schematic diagram of a hollow nanopillar according to an embodiment of the present disclosure.

As shown in FIG. 3C, the hollow nanopillar 213 may include a second cylinder 2131. The second cylinder 2131 is provided with a second hollow part 2132 which is cylindrical and extends from the top of the second cylinder 2131 to the bottom of the second cylinder 2131, and the second cylinder 2131 is arranged coaxially with the second hollow part 2132. The hollow nanopillar 213 has a cross section of an outer diameter $d_1$ and an inner diameter of $d_2$ on the x-y plane. $d_1$-$d_2$ ranges from 40 nm to 400 nm. For example, $d_1$-$d_2$ may be set as 40 nm, 50 nm, 150 nm, 200 nm, 250 nm, 300 nm, 350 nm, 400 nm or any value within the range.

Figure 3D:
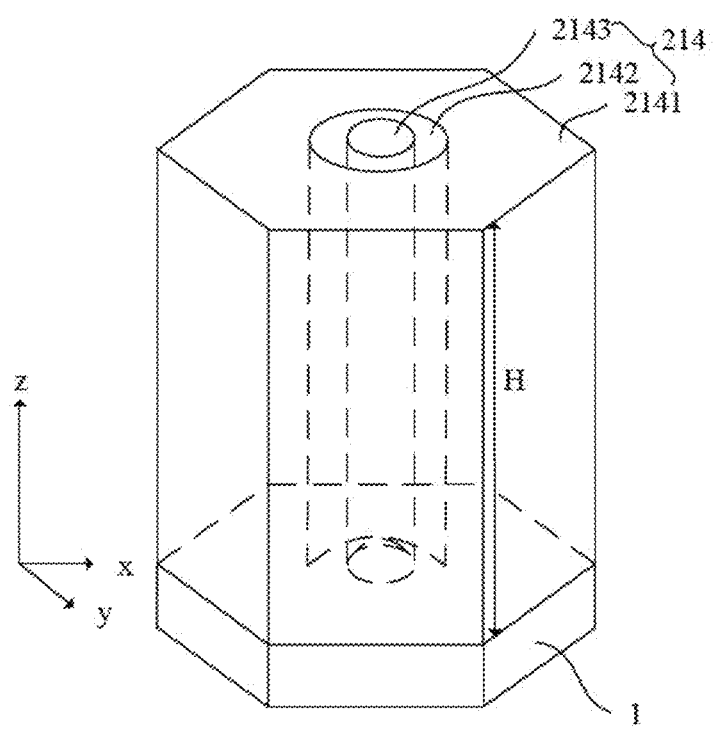
FIG. 3D is a schematic diagram of a negative hollow nanopillar according to an embodiment of the present disclosure.

As shown in FIG. 3D, the negative hollow nanopillar 214 may include a second column 2141. A shape of a cross section of the second column 2141 is the same as a shape of the unit cell 2. For example, in a case that the unit cell 2 is hexagonal, the cross section of the second column 2141 is hexagonal. In a case that the unit cell 2 is square, the cross section of the second column 2141 is square. In the embodiment, a size of the cross section of the second column 2141 is the same as the size of the unit cell 2. Further, the second column 2141 is provided with a third hollow part 2142 which is cylindrical and extends from the top of the second column 2141 to the bottom of the second column 2141. Further, the third hollow part 2142 is internally provided with a third cylinder 2143. The third cylinder 2143 is solid. The second column 2141, the third hollow part 2142 and the third cylinder 2143 are arranged coaxially with each other. In addition, a height of the second column 2141 is equal to the height of the third cylinder 2143, and a bottom of the third cylinder 2143 is attached to the substrate 1.

Figure 3E:
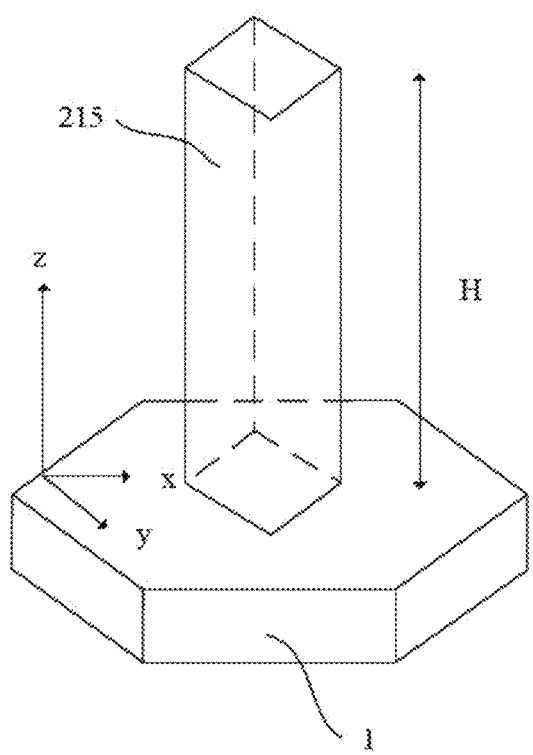
FIG. 3E is a schematic diagram of a square nanopillar according to an embodiment of the present disclosure.

As shown in FIG. 3E, the square nanopillar 215 may include a third column. The third column is solid, and a cross section of the third column is square.

Figure 3F:
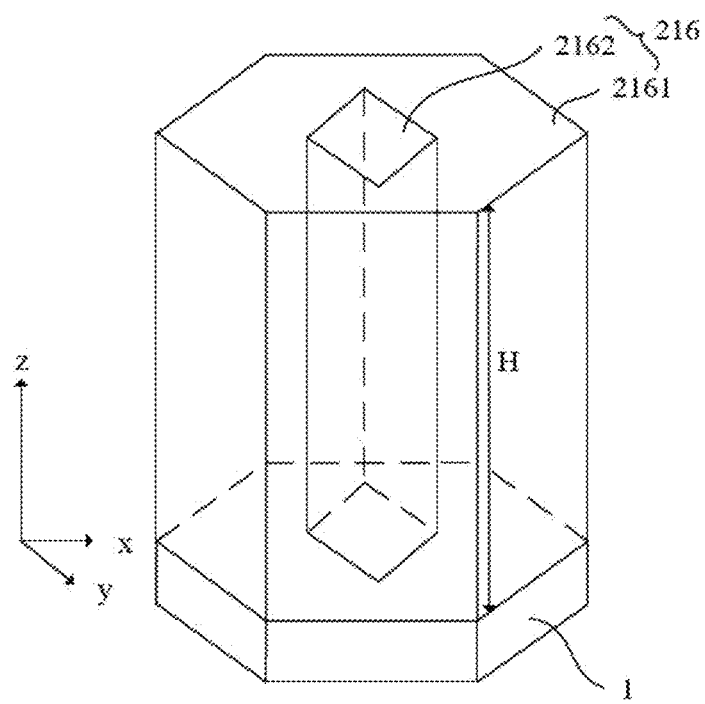
FIG. 3F is a schematic diagram of a negative square nanopillar according to an embodiment of the present disclosure.

As shown in FIG. 3F, the negative nanopillar 216 may include a fourth column 2161. A shape of a cross section of the fourth column 2161 is the same as the shape of the unit cell 2. For example, in a case that the unit cell 2 is hexagonal, the cross section of the fourth column 2161 is hexagonal. In a case that the unit cell 2 is square, the cross section of the fourth column 2161 is square. In the embodiment, a size of the cross section of the fourth column 2161 is the same as the size of the unit cell 2. Further, the fourth column 2161 is provided with a fourth hollow part 2162 extending from the top of the fourth column 2161 to the bottom of the fourth column 2161. A cross section of the fourth hollow part 2162 is square, and the fourth column 2161 is arranged coaxially with the fourth hollow part.

Figure 3G:
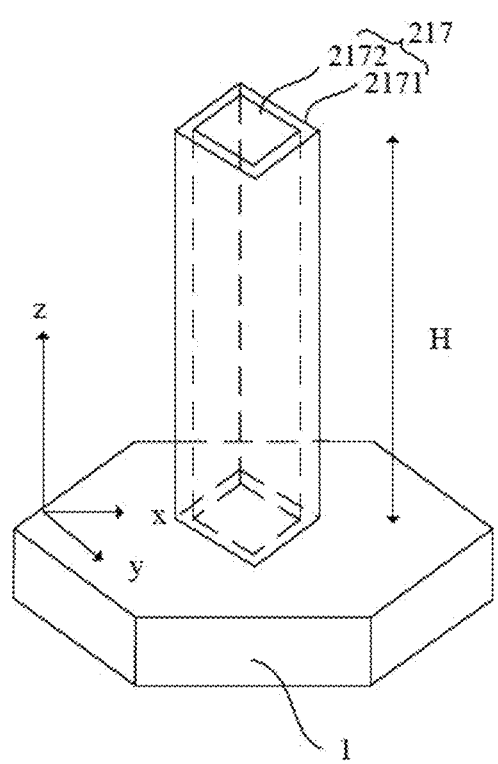
FIG. 3G is a schematic diagram of a hollow square nanopillar according to an embodiment of the present disclosure.

As shown in FIG. 3G, the hollow square nanopillar 217 may include a fifth column 2171. A cross section of the fifth column 2171 is square. Further, the fifth column 2171 is provided with a fifth hollow part 2172 extending from the top of the fifth column 2171 to the bottom of the fifth column 2171. A cross section of the fifth hollow part 2172 is square. In addition, the fifth column 2171 is arranged coaxially with the fifth hollow part 2172. On a same cross section, diagonal lines of a square corresponding to the fifth column 2171 are respectively collinear with diagonal lines of a square corresponding to the fifth hollow part 2172.

Figure 3H:
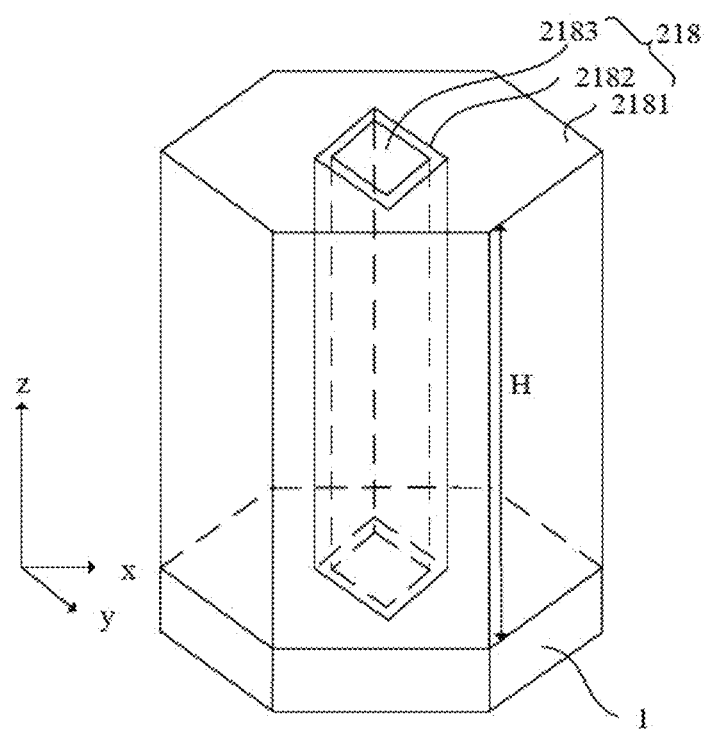
FIG. 3H is a schematic diagram of a negative hollow square nanopillar according to an embodiment of the present disclosure.

As shown in FIG. 3H, the negative hollow nanopillar 218 may include a sixth column 2181. A shape of a cross section of the sixth column 2181 is the same as the shape of the unit cell 2. For example, in a case that the unit cell 2 is hexagonal, the cross section of the sixth column 2181 is hexagonal. In a case that the unit cell 2 is square, the cross section of the sixth column 2181 is square. In the embodiment, a size of the cross section of the sixth column 2181 is the same as the size of the unit cell 2. Further, the sixth column 2181 is provided with a sixth hollow part 2182 extending from the top of the sixth column 2181 to the bottom of the sixth column 2181. A cross section of the sixth hollow part 2182 is square. The sixth hollow part 2182 is internally provided with a seventh column 2183. The seventh column 2183 is solid, and a cross section of the seventh column 2183 is square. In the embodiment, the sixth column 2181, the sixth hollow part 2182 and the seventh column 2183 are arranged coaxially with each other. In addition, on a same cross section, diagonal lines of a square corresponding to the seventh column 2183 are respectively collinear with diagonal lines of a square corresponding to the sixth hollow part 2182.

Figure 3I:
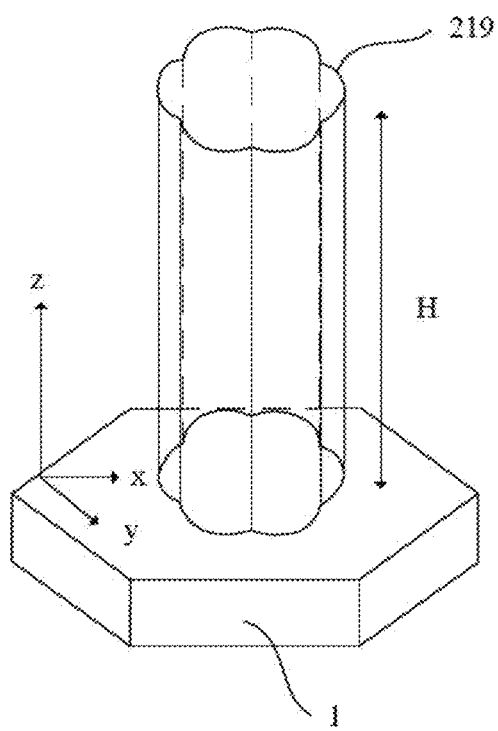
FIG. 3I is a schematic diagram of a topological nanopillar according to an embodiment of the present disclosure.

As shown in FIG. 3I, the topological nanopillar 219 may include an eighth column. The eighth column is solid. A cross section of the eighth column is a polygon, and edges of the polygon are arc-shaped.

Second Embodiment

Figure 2A:
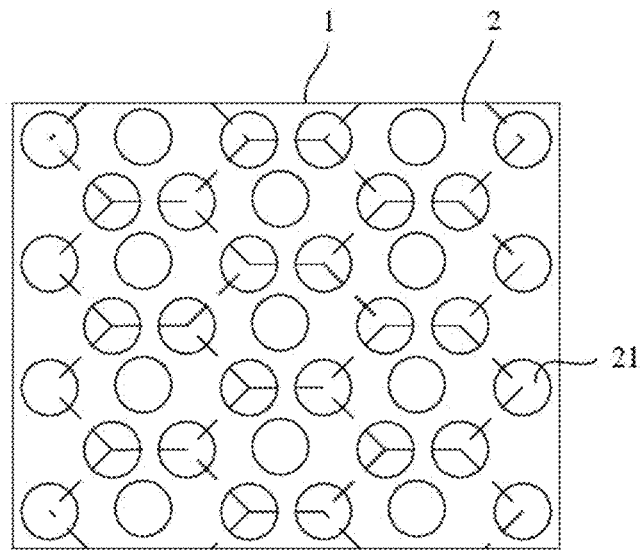
FIG. 2A is a diagram showing a metalens having nanostructures arranged in a regular hexagonal pattern on a surface of the metalens according to an embodiment of the present disclosure.
Figure 2B:
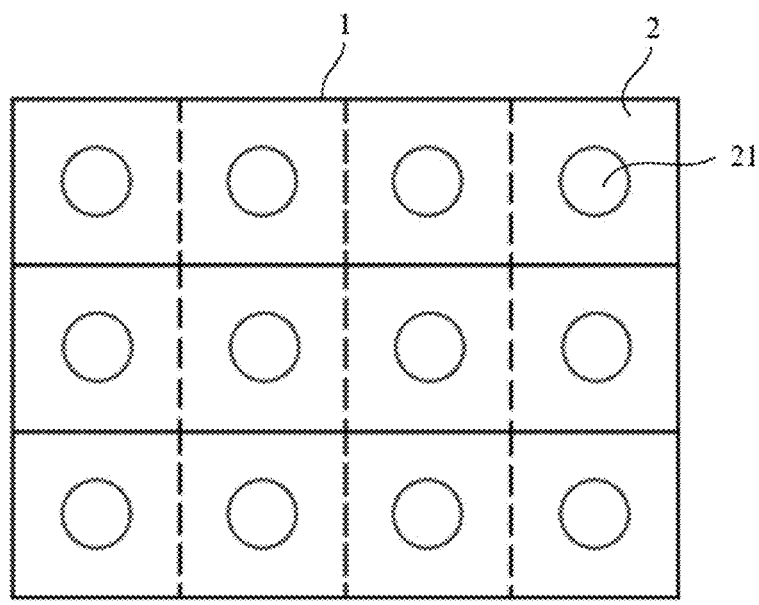
FIG. 2B is a diagram showing a metalens having nanostructures arranged in a square pattern on a surface of the metalens according to an embodiment of the present disclosure.

A metalens 200 is provided according to an embodiment of the present disclosure, as shown in FIGS. 1 to 2B. The metalens may include a substrate 1 and a plurality of unit cells 2 arranged on a surface of the substrate 1. The substrate 1 is capable of transmitting light of different wavelengths. In the embodiment of the present disclosure, the light of different wavelengths may include visible light and infrared light, and may include others. For example, the wavelength of visible light transmitted by the substrate 1 may be greater than or equal to 400 nm and less than or equal to 700 nm. For example, the wavelength of infrared light transmitted by the substrate 1 may be greater than or equal to 8 μm and less than or equal to 12 μm. A metalens surface of the metalens 200 is divided into a plurality of concentric circular regions 230 along the radial direction, and for each circular region 230, the incident broadband light is able to focus without chromatic aberration. The circular regions on the metalens surface are configured to allow for interference enhancement of a central wavelength and two edge wavelengths of an incident light at a focal plane of the metalens. Alternatively, the nanostructures 21 on the metalens surface are optimally selected from a nanostructure library containing thousands to tens of thousands of unidentified polarizations (for example, the part of the metalens surface as shown in FIG. 1) so that characteristic wavelengths are focused to the same focal point, thus solving the difficulty in satisfying large aperture and large numerical aperture of the achromatic metalens at the same time.

The unit cells 2 are arranged in an array, and each unit cell 2 is regular hexagonal or square. For example, as shown in FIG. 2B, a center of each of the unit cells 2 is provided with one nanostructure 21, with this arrangement, a metalens 200 with a minimum number of nanostructures 21 can be formed, while the performance of the metalens 200 meets the requirements. For example, as shown in FIG. 2A, each of vertexes and a center of each unit cell 2 is provided with one nanostructure 21. It should be understood that one nanostructure 21 mentioned herein is described as a whole, and in some embodiments, the nanostructure 21 may include a plurality of sub-nanostructures, and thus is considered as a plurality of nanostructures.

For example, in some embodiments, as shown in FIG. 2A, all the unit cells 2 are regular hexagonal. In other embodiments, as shown in FIG. 2B, all the unit cells 2 are square. In other embodiments, the unit cells 2 include regular hexagonal array units and square unit cells 2. It should be understood that in other embodiments, the unit cell 2 may also be designed to have other regular polygons.

In the embodiment, for each of the nanostructures 21 at a certain position, an optical phase of the nanostructure 21 changes with a wavelength, so as to define the optical phase distribution of the metalens at different wavelengths, thus forming a broadband metalens. It should be noted that an overall structure formed by the whole nanostructures 21 according to the embodiment of the present disclosure may transmit the visible light and the infrared light and may also transmit lights of different wavebands.

For example, a thickness of the substrate 1 is greater than or equal to 0.1 mm and less than 2 mm. For example, the thickness of the substrate 1 may be 0.1 mm, 0.5 mm, 1 mm, 1.5 mm, 2 mm, or any value within the range.

A thickness of the overall structure formed by the whole nanostructures 21 according to the embodiment is in a micron scale. Therefore, the entirety of the nanostructures 21 on the substrate 1 is approximately planar. In an embodiment, the thickness of the overall structure formed by the nanostructures 21 is less than or equal to 50 μm, such as 1.5 μm, 5 μm, 10 μm, 1.5 μm, 20 μm, 25 μm, 30 μm, 35 μm, 40 μm, 45 μm or 50 μm. In an embodiment, the thickness of the overall structure formed by the nanostructures 21 is of the same order of magnitude as an operating wavelength of a metalens system. In addition, it should be noted that, in the embodiment of the present disclosure, the thickness of the metalens is a sum of the thickness of the overall structure formed by the nanostructures 21 and the thickness of the substrate 1. It should be noted that the substrate 1 is configured to support the nanostructures 21. A material of the substrate 1 may be the same as or different from a material of the nanostructure 21.

For example, the substrate 1 may be made of quartz glass or crystalline silicon. It should be understood that the substrate 1 may also be made of other materials.

For example, the nanostructures 21 may be made of at least one of the following materials: photoresist, quartz glass, silicon nitride, titanium oxide, aluminum oxide (sapphire), crystalline silicon and amorphous silicon, gallium nitride, crystalline germanium, selenium sulfide, zinc sulfide and sulfur-based glass. It should be understood that the nanostructures 21 may also be made of other materials. Furthermore, in the embodiment of the present disclosure, the shape of the metalens 200 is determined by the shape of the substrate, and the substrate 1 may be in a regular shape such as circle, square, square polygon, or an irregular shape. For example, the substrate 1 is circular, and the metalens 200 is circular. For example, the substrate 1 is square, and the metalens 200 is square.

The nanopillar is processed on the substrate 1 by one of the following processing methods: a large-aperture high-speed laser direct writing processing method, a photolithography processing method, and a nanoimprinting processing method, but not limited to the above processing methods.

Figure 4A:
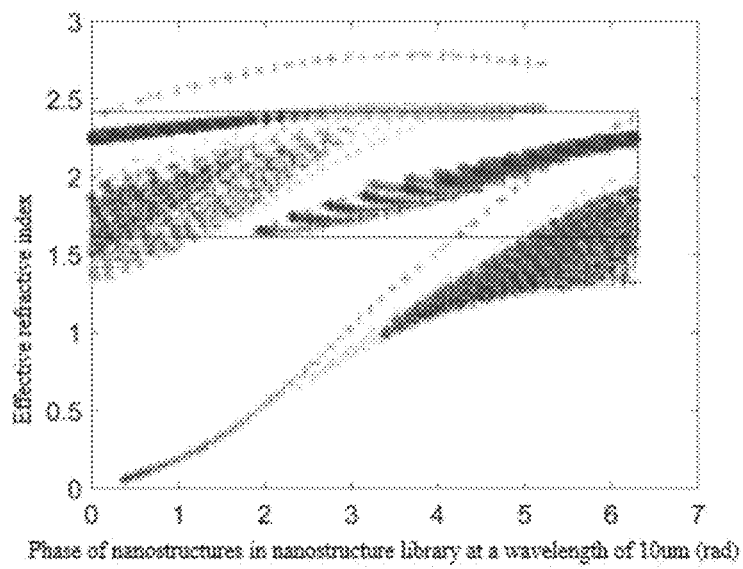
FIG. 4A is a diagram showing a relationship between an optical phase and an effective refractive index of a silicon-based nanostructure at a wavelength of 10 μm according to an embodiment of the present disclosure (operating wavelength is between 8 to 12 μm)

For example, in some embodiments, the circular regions 230 on the metalens surface of the metalens 200 are periodically arranged according to the effective refractive index of the metalens along the radial direction. The effective refractive index of the metalens 200 is as shown in equation (1).

$$n_{eff}(r) = \frac{\varphi(r, \lambda) \cdot c}{\omega \cdot H} \quad (1)$$

in equation (1), $\varphi(r,\lambda)$ represents a phase of the metalens surface at a radius r with a wavelength $\lambda$; $\omega$ represents a circular frequency of light; c represents a speed of light; H represents the height of the nanopillar; and r represents the radius of the surface of the metalens 200, that is, a distance from each nanostructure 21 to the center of substrate 1. As shown in the square frame of FIG. 4A, an effective refractive index interval in effective refractive index database of the nanostructures 21 is obtained by subtracting the minimum effective refractive index from the maximum effective refractive index while ensuring that the central phase traverses the entire $2\pi$ as much as possible, that is, $\Delta n_{eff}$.

The periodic effective refractive index is obtained by taking a remainder of the effective refractive index in equation (1) to the effective refractive index interval in the effective refractive index database of the nanostructure, as shown in the following equation (2):

$$n_{eff\_P}(r) = \mathrm{mod}(n_{eff}(r), \Delta n_{eff}) \quad (2).$$

For example, in some embodiments, the circular regions 230 on the metalens surface of the metalens 200 are periodically arranged according to the group delay of the metalens along the radial direction. The group delay of the metalens surface of the metalens 200 in the radial direction is shown in the following equation (3).

$$GD(r) = \frac{\partial \varphi(r, \omega)}{\partial \omega} \quad (3)$$

Figure 4B:
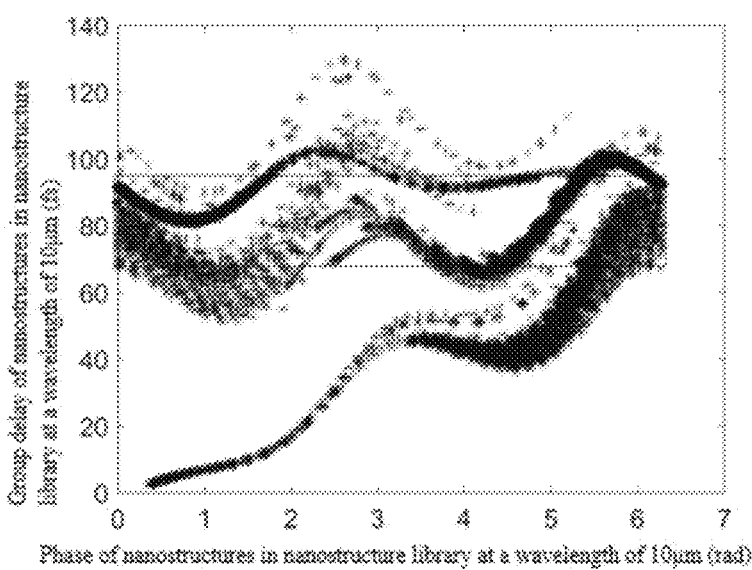
FIG. 4B is a diagram showing a relationship between an optical phase and a group delay of a silicon-based nanostructure at a wavelength of 10 μm according to an embodiment of the present disclosure (operating wavelength is between 8 to 12 μm)

As shown in the square frame in FIG. 4B, the group delay interval in the group delay database of the nanostructures is obtained by subtracting the minimum group delay from the maximum group delay while ensuring that the central phase traverses the entire $2\pi$ as much as possible, that is, $\Delta GD$.

The periodic group delay is obtained by taking a remainder of the group delay in equation (3) to the group delay interval in the group delay database of the nanostructure, as shown in the following equation (4):

$$GD_P(r) = \mathrm{mod}(GD(r), \Delta GD) \quad (4)$$

in equation (4), $GD_P(r)$ represents a group delay at a radius r of a metalens.

For example, in some embodiments, the incident broadband light is discretized into N characteristic wavelengths, and a sum of an absolute value of difference of a theoretical phase and a phase of nanostructures on the metalens surface along a radial direction at a radius $r_0$ at each of the N characteristic wavelengths is minimum, as shown in the following equation (5).

$$\min \sum_{i=1}^{N} c_i |\varphi_{nano\_structure}(r_0, \lambda_i) - \varphi_{theory}(r_0, \lambda_i)| \quad (5)$$

in equation (5), $\varphi_{nano\_structure}(r_0, \lambda_i)$ represents the phase of the nanostructures on the metalens surface along the radial direction at the radius $r_0$ at a characteristic wavelength $\lambda_i$, i=1, 2, . . . , N; $\varphi_{theory}(r_0, \lambda_i)$ represents the theoretical phase of the nanostructures on the metalens surface along the radial direction at the radius $r_0$ at the characteristic wavelength $\lambda_i$; $c_i$ represents an optimization weight corresponding to the i-th characteristic wavelength. The equation (5) is solved by using an exhaustive method to iterate over all structures in the nanostructure data library to obtain an optimal solution.

Third Embodiment

An achromatic and aplanatic metalens system is further provided according to an embodiment of the present disclosure, which may include a lens cone (not shown) and a metalens 200. The metalens 200 is arranged in the lens cone, and an optical phase of the metalens changes with a wavelength, to achieve focusing/divergence without chromatic aberration and spherical aberration.

Figure 5A:
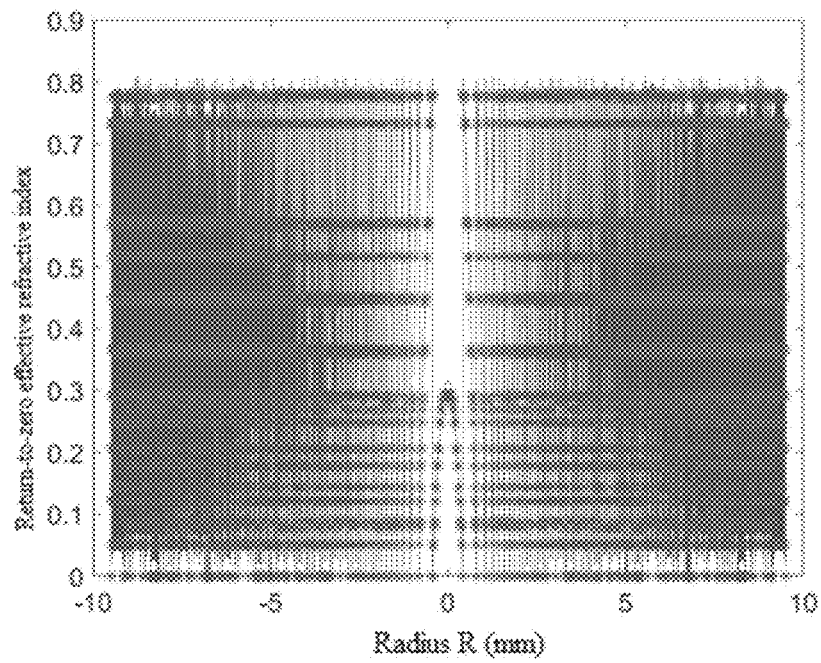
FIG. 5A is a diagram showing a relationship between a (theoretical/realized) periodic effective refractive index of a metalens and a radius of the metalens with a focal length of 25 mm and an aperture of 19 mm according to an embodiment of the present disclosure.
Figure 5B:
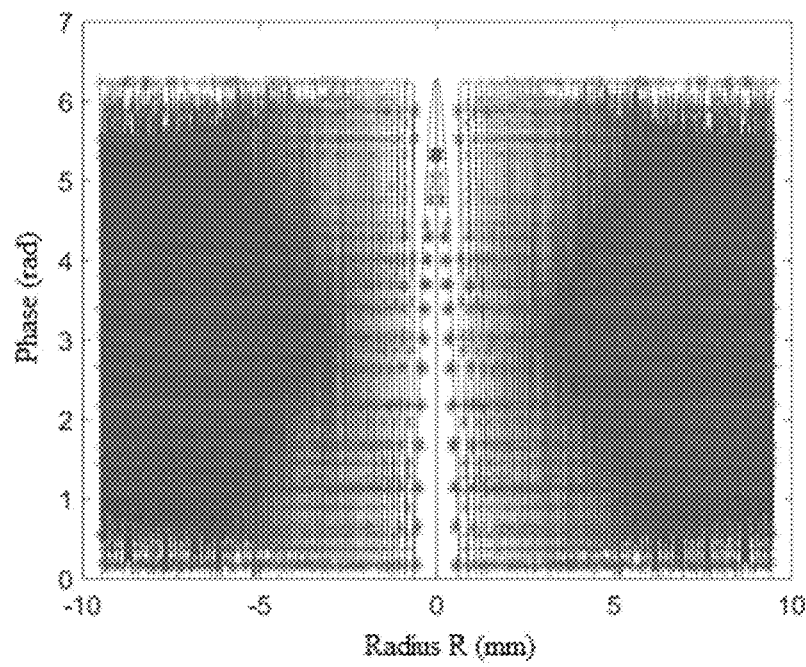
FIG. 5B is a diagram showing a relationship between a (theoretical/realized) phase of a metalens and a radius of the metalens with a focal length of 25 mm and an aperture of 19 mm at a wavelength of 8 μm according to an embodiment of the present disclosure.
Figure 5C:
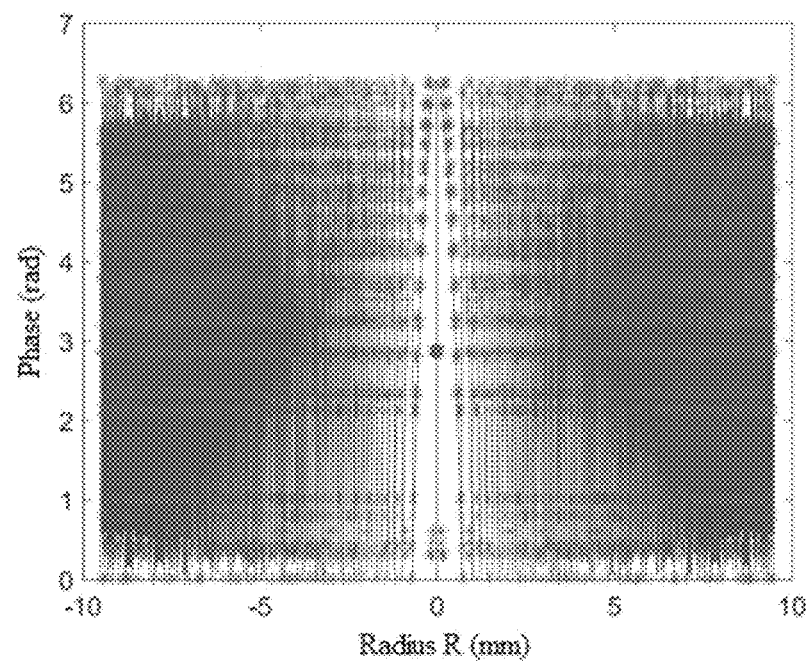
FIG. 5C is a diagram showing a relationship between a (theoretical/realized) phase of a metalens and a radius of the metalens with a focal length of 25 mm and an aperture of 19 mm at a wavelength of 8 μm according to an embodiment of the present disclosure (by an effective refractive index method)
Figure 5D:
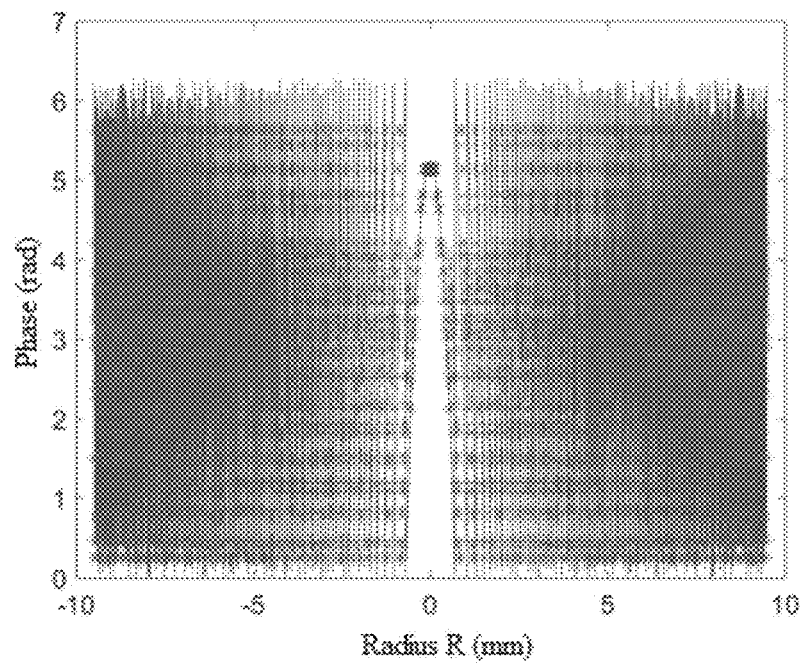
FIG. 5D is a diagram showing a relationship between a (theoretical/realized) phase of a metalens and a radius of the metalens with a focal length of 25 mm and an aperture of 19 mm at a wavelength of 8 μm according to an embodiment of the present disclosure (by an effective refractive index method)
Figure 6A:
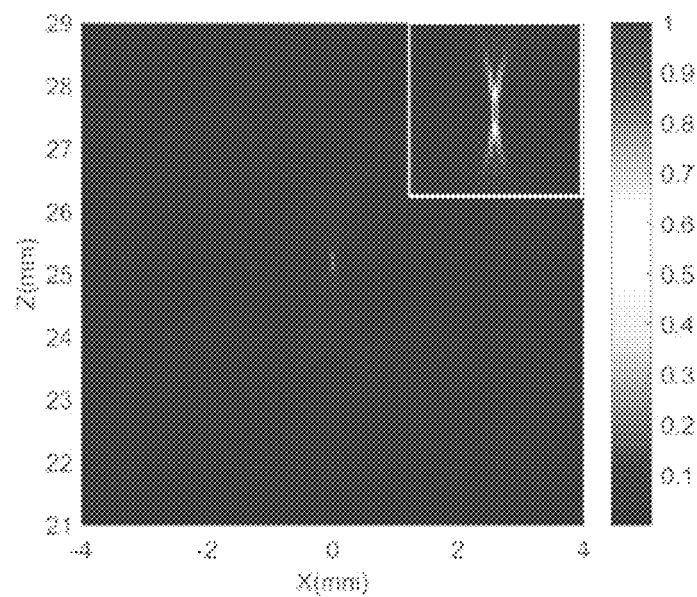
FIG. 6A is a schematic diagram showing light intensity distribution at a x-z plane near a focal point of a metalens with a focal length of 25 mm and an aperture of 19 mm, designed using the effective refractive index method.

For example, the metalens 200 has an operating waveband of 8~12 μm, an aperture of 19 mm, and a focal length of 25 mm. A relationship between a (theoretical/realized) periodic effective refractive index of a metalens 200 and a radius of the metalens is as shown in FIG. 5A, where the solid line represents the theoretically required effective refractive index and the star dot represents an achievable effective refractive index in the nanostructure library. FIGS. 5B to 5D show relationships between a (theoretical/realized) phase of a metalens 200 and a radius of the metalens respectively at operating wavelengths of 8 μm, 10 μm, and 12 μm. Light intensity distribution at a x-z plane near a focal point of a metalens designed using the periodic effective refractive index method is as shown in FIG. 6A.

Figure 5E:
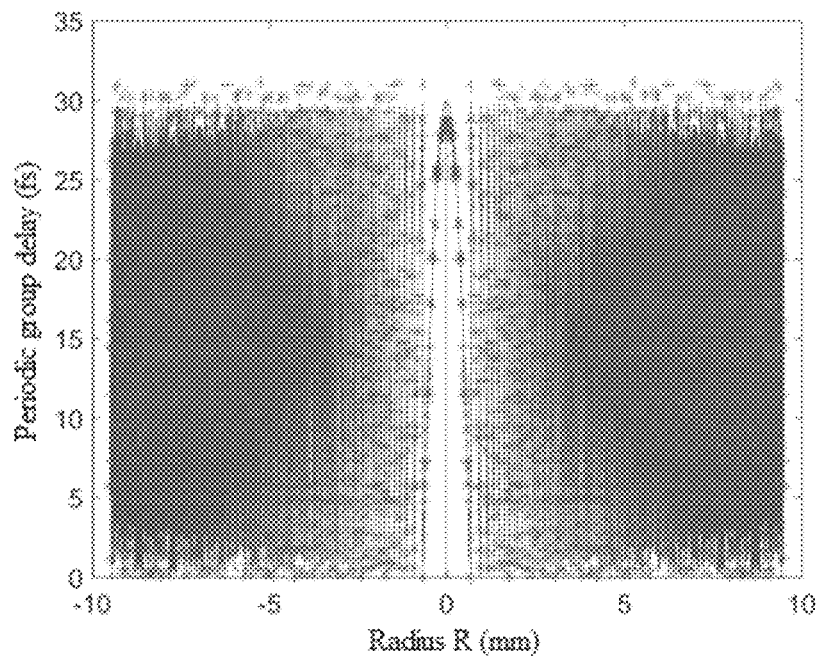
FIG. 5E is a diagram showing a relationship between a (theoretical/realized) periodic group delay of a metalens and a radius of the metalens with a focal length of 25 mm and an aperture of 19 mm according to an embodiment of the present disclosure (by a group delay method)
Figure 5F:
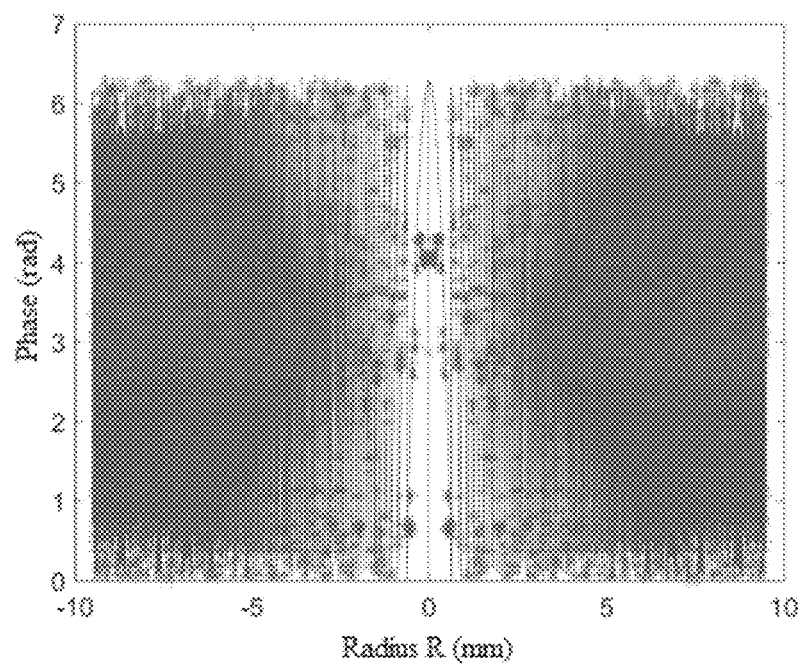
FIG. 5F is a diagram showing a relationship between a (theoretical/realized) phase of a metalens and a radius of the metalens with a focal length of 25 mm and an aperture of 19 mm at a wavelength of 8 μm according to an embodiment of the present disclosure (by a group delay method)
Figure 5G:
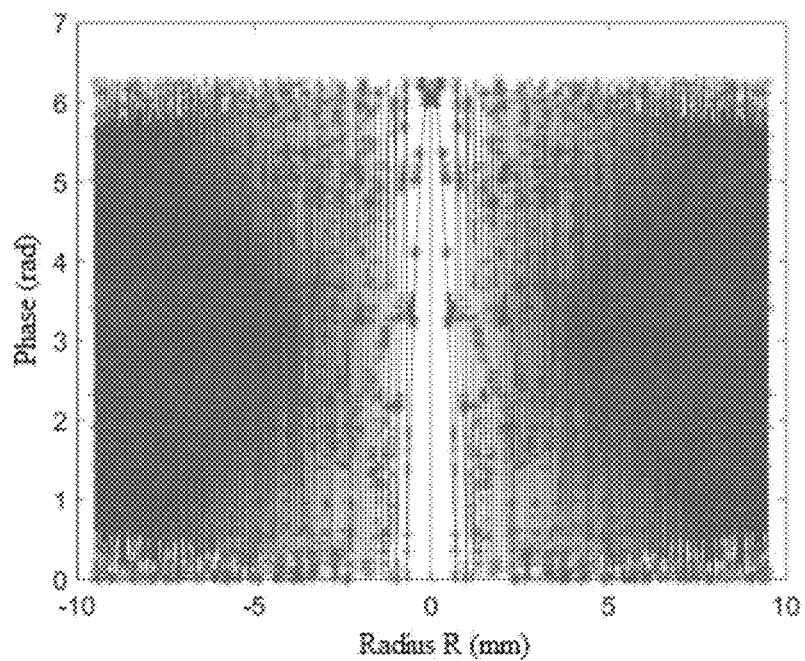
FIG. 5G is a curve graph showing a relationship between a (theoretical/realized) phase of a metalens and a radius of the metalens with a focal length of 25 mm and an aperture of 19 mm at a wavelength of 10 μm according to an embodiment of the present disclosure (by a group delay method)
Figure 5H:
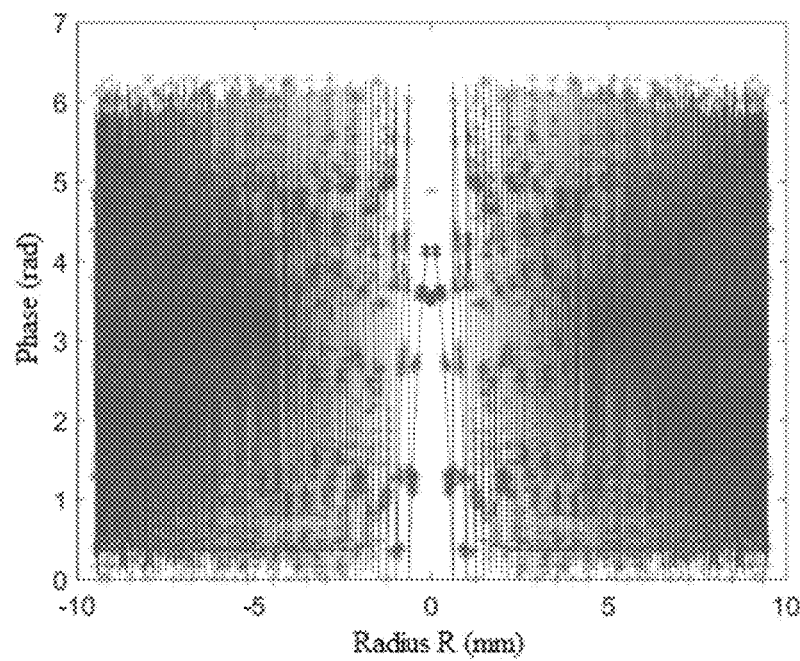
FIG. 5H is a curve graph showing a relationship between a (theoretical/realized) phase of a metalens and a radius of the metalens with a focal length of 25 mm and an aperture of 19 mm at a wavelength of 12 μm according to an embodiment of the present disclosure (by a group delay method)
Figure 6B:
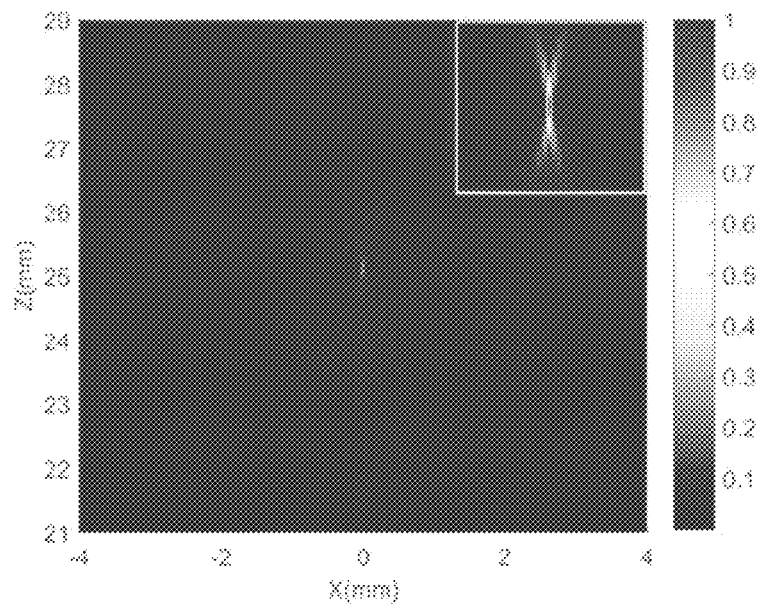
FIG. 6B is a schematic diagram showing light intensity distribution at a x-z plane near a focal point of a metalens with a focal length of 25 mm and an aperture of 19 mm, designed using the group delay method.

For example, the metalens 200 has an operating waveband of 8~12 μm, an aperture of 19 mm, and a focal length of 25 mm. A relationship between a (theoretical/realized) periodic group delay of the metalens 200 and a radius of the metalens is as shown in FIG. 5E, where the solid line represents a theoretically required group delay, and the star dot represents an achievable group delay in the nanostructure library. FIGS. 5F to 5H show relationships between a (theoretical/realized) phase of the metalens 200 and a radius of the metalens respectively at operating wavelengths of 8 μm, 10 μm, and 12 μm. Light intensity distribution at a x-z plane near a focal point of a metalens designed by using the periodic group delay method is as shown in FIG. 6B.

Figure 5I:
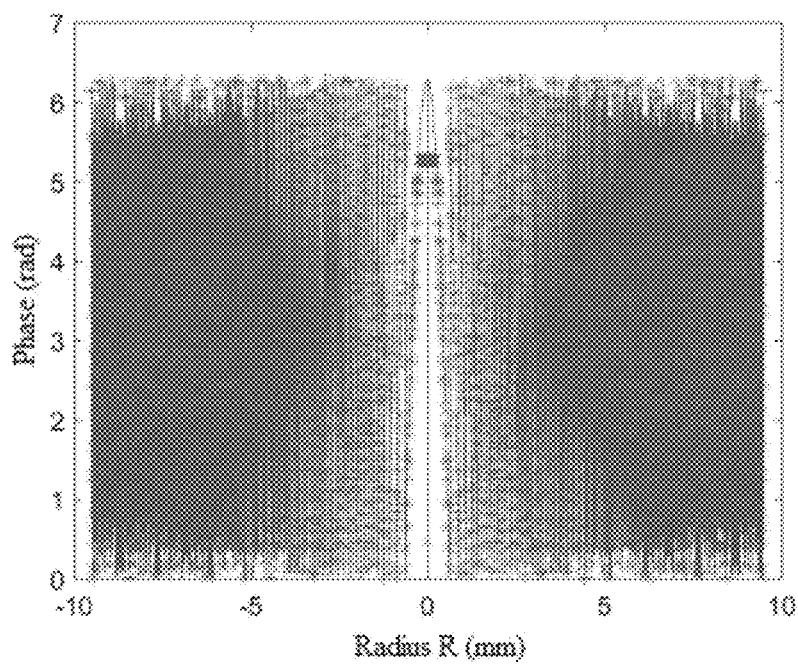
FIG. 5I is a curve graph showing a relationship between a (theoretical/realized) phase of a metalens and a radius of the metalens with a focal length of 25 mm and an aperture of 19 mm at a wavelength of 8 μm according to an embodiment of the present disclosure (by a global search method)
Figure 5J:
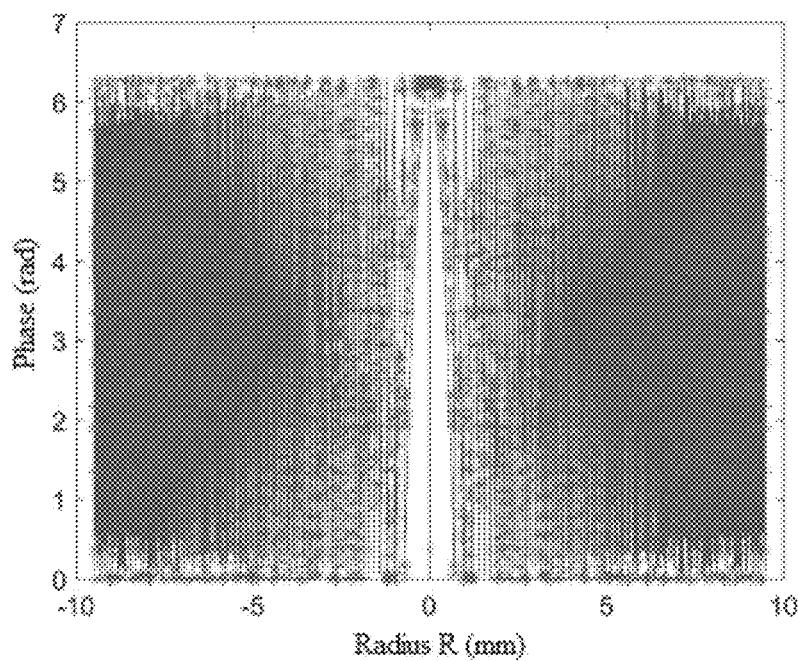
FIG. 5J is a curve graph showing a relationship between a (theoretical/realized) phase of a metalens and a radius of the metalens with a focal length of 25 mm and an aperture of 19 mm at a wavelength of 10 μm according to an embodiment of the present disclosure (by a global search method)
Figure 5K:
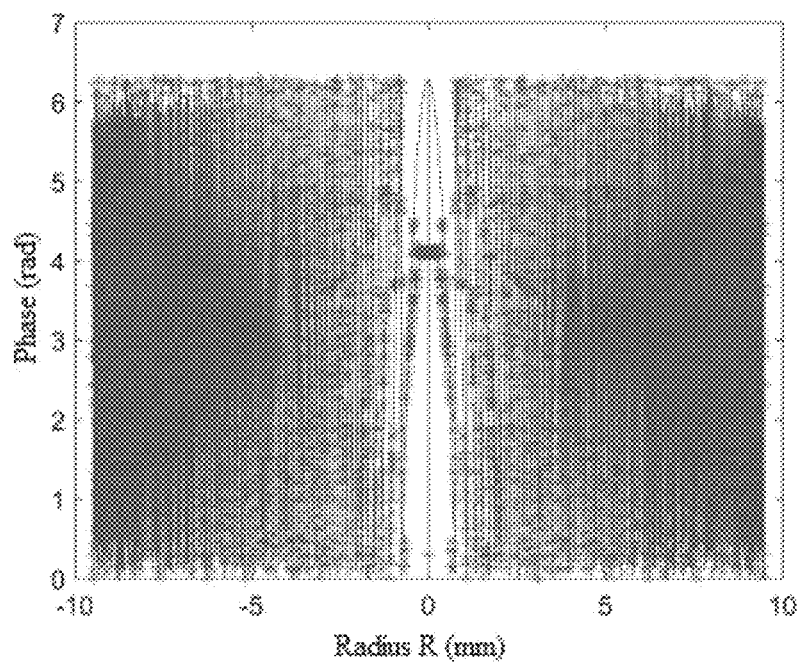
FIG. 5K is a curve graph showing a relationship between a (theoretical/realized) phase of a metalens and a radius of the metalens with a focal length of 25 mm and an aperture of 19 mm at a wavelength of 12 μm according to an embodiment of the present disclosure (by a global search method)
Figure 6C:
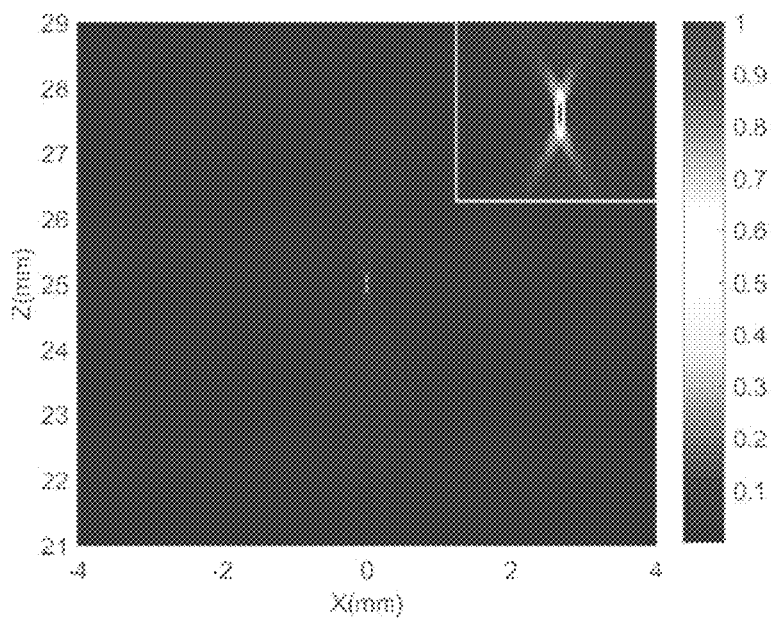
FIG. 6C is a schematic diagram showing light intensity distribution at a x-z plane near a focal point of a metalens with a focal length of 25 mm and an aperture of 19 mm, designed using the global search method.
Figure 7:
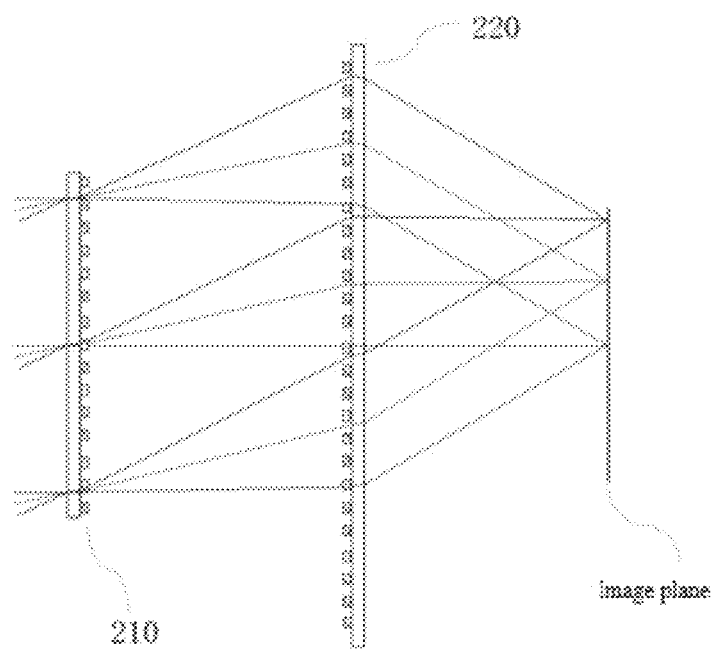
FIG. 7 is a schematic diagram of an optical system including two metalenses at an operating wavelength of 8 to 12 μm according to an embodiment of the present disclosure.

For example, the metalens 200 has an operating waveband of 8~12 μm, an aperture of 19 mm, and a focal length of 25 mm. FIGS. 5I to 5K show relationships between a (theoretical/realized) phase of the metalens and a radius of the metalens respectively at operating wavelengths of 8 μm, 10 μm, and 12 μm. Light intensity distribution at a x-z plane near a focal point of a metalens designed by using the global search method is as shown in FIG. 6C.

For example, since the achromatic and aplanatic metalens system has an operating wavelength in the far-infrared light band, in order to improve the transmission rate of the achromatic and aplanatic metalens system in the far-infrared light band, for example, the other surface of the substrate 1 of the metalens 200, that is, the surface of the substrate 1 without the nanostructures, is coated with a first antireflection film dedicated to an infrared light band, and the metalens surface formed by one surface of the substrate is coated with a second antireflection film dedicated to the infrared light band, and the substrate 1 and the nanostructures 21 are both made of crystalline silicon, and the first antireflection film dedicated to the infrared light band and the second antireflection film dedicated to the infrared light band both matches with an effective refractive index of crystalline silicon, where the materials of the first antireflection film dedicated to the infrared light band and the materials of the second antireflection film dedicated to the infrared light band may be the same or different from each other.

In an embodiment, the other surface of the substrate 1 of the metalens may be coated with a first antireflection film dedicated to a visible light band, and the metalens surface is coated with a second antireflection film dedicated to the visible light band, and the substrate of the metalens is made of quartz glass. The first antireflection film dedicated to the visible light band matches with an effective refractive index of the quartz glass, and the nanostructures 21 of the metalens are made of one or more of silicon nitride, titanium oxide, gallium nitride, aluminum oxide, and silicon dioxide. The second antireflection film dedicated to the visible light band matches with the effective refractive index of materials of the above nanostructures.

Fourth Embodiment

An optical system is further provided according to an embodiment of the present disclosure, which may include a lens cone (not shown) and two metalenses. The two metalenses include a first metalens 210 and a second metalens 220. The first metalens 210 and the second metalens 220 have different nanostructures on unit cells of the metalens surfaces at the same radius. For example, for nanostructures on unit cells of the metalens surface at the same radius, each of the nanostructures of one of the two metalenses are a hollow nanopillar, each of the nanostructures of the other one of the two metalenses are a negative square nanopillar. The incident light sequentially passes through the first metalens 210 and the second metalens 220, and the first metalens 210 is used to correct all aberrations of the second metalens 220.

Figure 8A:
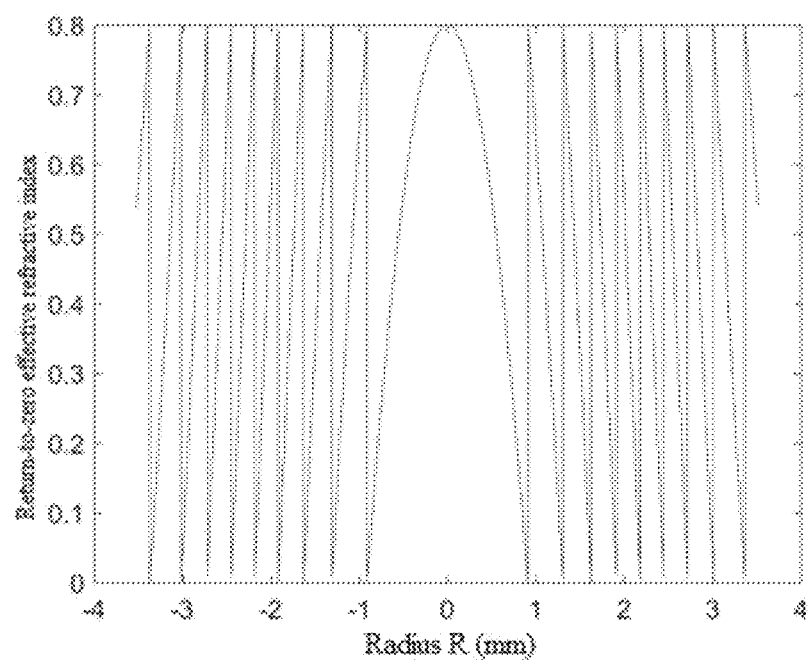
FIG. 8A is a curve graph showing a relationship between an effective refractive index of a first metalens and a radius of the first metalens in the optical system shown in FIG. 7.
Figure 8B:
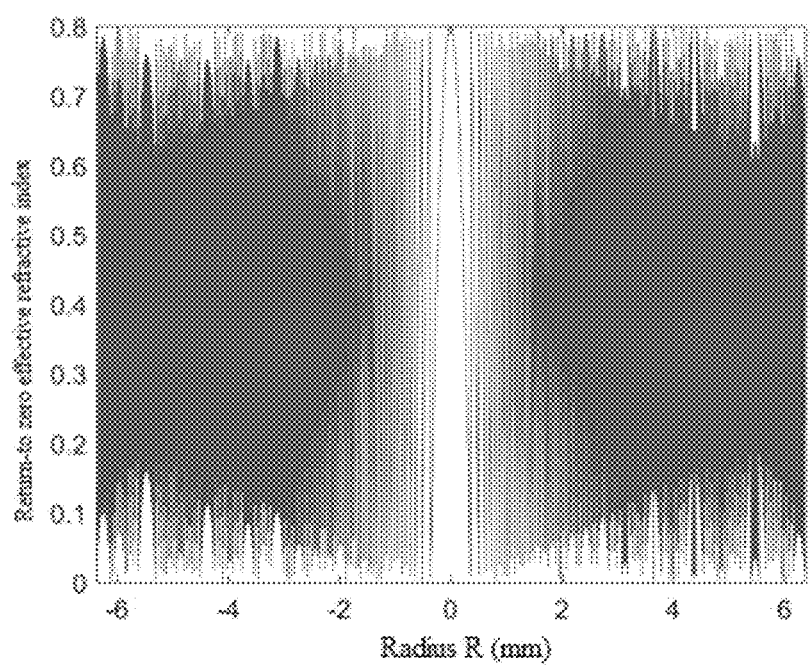
FIG. 8B is a curve graph showing a relationship between an effective refractive index of a second metalens and a radius of the second metalens in the optical system shown in FIG. 7.

For example, the metalens system has an operating waveband of 8~12 μm, an entrance pupil aperture of 7 mm, a focal length of 7 mm, and a full field of view of 50°×38.5°. Relationships between a (theoretical/realized) periodic effective refractive index of a first metalens and a radius of the first metalens in the optical system and relationships between a (theoretical/realized) periodic effective refractive index of a second metalens and a radius of the second metalens in the optical system are respectively as shown in FIGS. 8A and 8B, where the solid line represents a theoretically required effective refractive index and the star dot represents an achievable effective refractive index in the nanostructure library.

Figure 9:
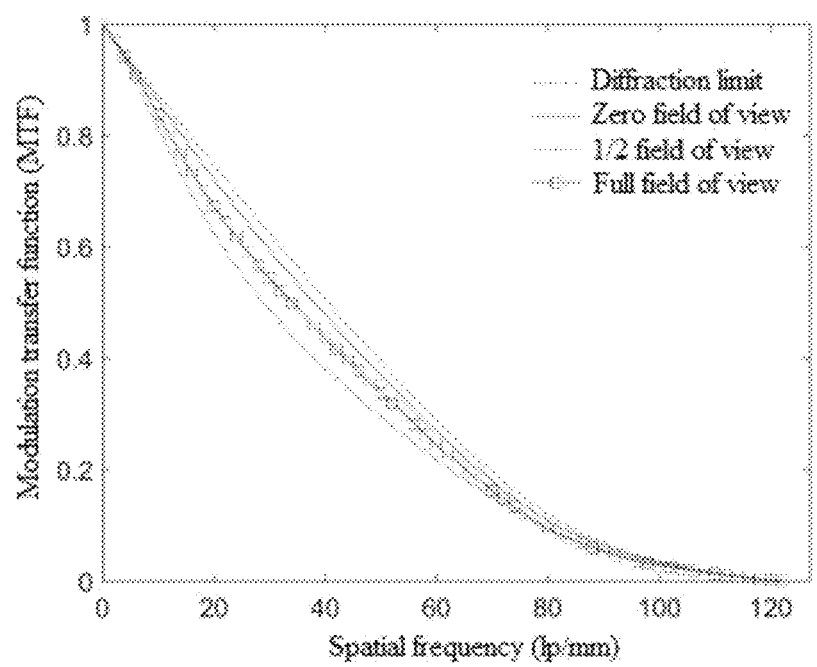
FIG. 9 is a curve graph showing a modulation transfer function of the optical system shown in FIG. 7.

The modulation transfer function of the optical system is as shown in FIG. 9. As shown in FIG. 9, the modulation transfer function of each field of view reaches the diffraction limit, demonstrating the good broadband and wide-angle imaging capability of the optical system including the metalenses.

The above embodiments are only used for illustrating the technical solutions of the present disclosure, and are not intended to limit the present disclosure. Although the present disclosure is illustrated in detail with reference to the embodiments described above, it should be understood by those skilled in the art that modification can be made to the technical solutions recited in the embodiments described above, or equivalent substitution can be made onto a part of technical features of the technical solution. The modifications and equivalent replacements will not make the corresponding technical solutions deviate from the scope of the technical solutions of the embodiments of the present disclosure.

The invention claimed is:

1. A large-aperture achromatic metalens, comprising:
a substrate, configured to transmit light of different wavebands; and
a plurality of unit cells arranged in an array on a surface of the substrate, wherein a center of each of the unit cells is provided with one of nanostructures, or each of the center and vertexes of each of the unit cells is provided with one of the nanostructures, wherein
the nanostructures are symmetrically arranged with respect to a first axis and a second axis, and the nanostructures on the metalens being divided along the first axis and the second axis form identical nanostructures, wherein the first axis is perpendicular to the second axis, and the first axis and the second axis are both perpendicular to a longitudinal direction of the nanostructures;
a metalens surface is formed on the surface of the substrate with the plurality of unit cells, the metalens surface is divided into a plurality of circular regions along a radial direction of the metalens surface; the circular regions are concentric; and for each of the circular regions, incident broadband light is able to focus without chromatic aberration;
the plurality of circular regions on the metalens surface as a whole are configured to allow for interference enhancement of a central wavelength and two edge wavelengths of the incident broadband light at a focal plane of the large-aperture achromatic metalens;

the circular regions on the metalens surface are periodically arranged according to an effective refractive index of the large-aperture achromatic metalens along the radial direction; the effective refractive index is between a refractive index of a material of the nanostructures and a refractive index of air; or the circular regions on the metalens surface are periodically arranged according to a group delay of the large-aperture achromatic metalens along the radial direction; a period of the group delay is determined by subtracting a minimum group delay from a maximum group delay in a nanostructure library.

2. The large-aperture achromatic metalens according to claim 1, wherein the light of different wavebands comprises visible light and infrared light.

3. The large-aperture achromatic metalens according to claim 1, wherein the nanostructures are nanopillars, and the nanopillars comprise one or more of a positive nanocylinder, a negative nanocylinder, a hollow nanopillar, a square nanopillar, and a topological nanopillar.

4. The large-aperture achromatic metalens according to claim 3, wherein the nanopillars comprise one or more of a negative square nanopillar and a hollow square nanopillar.

5. The large-aperture achromatic metalens according to claim 3, wherein an optical phase of each of the nanopillars is related to a height, a shape of a cross section and a material of each of the nanopillars, wherein the cross section is parallel to the substrate; and the nanostructures are made of one or more of following materials: photoresist, quartz glass, silicon nitride, titanium oxide, aluminium oxide, crystalline silicon, amorphous silicon, gallium nitride, crystalline germanium, selenium sulfide, zinc sulfide and sulphur-based glass.

6. The large-aperture achromatic metalens according to claim 1, wherein the incident broadband light is discretized into N characteristic wavelengths, and a sum of an absolute value of difference of a theoretical phase and a phase of the nanostructures on the metalens surface along a radial direction at a radius r0 at each of the N characteristic wavelengths is minimum, which is optimized according to a following equation:

$$\min \sum_{i=1}^{N} |\varphi_{nano\_structure}(r_0, \lambda_i) - \varphi_{theory}(r_0, \lambda_i)|$$

wherein, φnano_structure(r0, λi) represents the phase of the nanostructures on the metalens surface along the radial direction at the radius r0 at a characteristic wavelength λi, i=1, 2, . . . , N; φtheory (r0, λi) represents the theoretical phase of the nanostructures on the metalens surface along the radial direction at the radius r.sub.0 at the characteristic wavelength λi.

7. The large-aperture achromatic metalens according to claim 1, wherein the metalens surface is coated with an antireflection film corresponding to the nanostructures, and another surface of the substrate is coated with an antireflection film corresponding to a material of the substrate.

8. An achromatic and aplanatic metalens system, comprising:

a lens cone;

the large-aperture achromatic metalens according to claim 1, wherein the large-aperture achromatic metalens is arranged in the lens cone, an optical phase of the large-aperture achromatic metalens is variable at different wavelengths.

9. An optical system, comprising:

a lens cone; and the large-aperture achromatic metalens according to claim 1, wherein the large-aperture achromatic metalens comprises at least two large-aperture achromatic metalenses;

nanostructures on unit cells of metalens surfaces of the at least two large-aperture achromatic metalenses at a same radius are different from each other;

the at least two large-aperture achromatic metalenses are coaxially arranged in the lens cone, and an optical phase of each of the at least two large-aperture achromatic metalenses is variable at different wavelengths, and at least one of the at least two large-aperture achromatic metalenses is configured to correct an aberration of other large-aperture achromatic metalens at a wavelength.

10. The optical system according to claim 9, wherein one of the at least two large-aperture achromatic metalenses is configured to correct an aberration of other large-aperture achromatic metalenses, and the aberration comprises at least one of a spherical aberration, a coma aberration, astigmatism, field curvature, distortion, a positional aberration and a magnification aberration.

11. The optical system according to claim 9, wherein the at least two large-aperture achromatic metalenses comprise a first metalens and a second metalens, an incident light sequentially passes through the first metalens and the second metalens, wherein the first metalens is configured to correct all aberrations of the second metalens.

12. The large-aperture achromatic metalens according to claim 1, wherein another surface of the substrate is coated with a first antireflection film dedicated to a visible light band, and the metalens surface is coated with a second antireflection film dedicated to a visible light band.

13. The large-aperture achromatic metalens according to claim 1, wherein the substrate is made of quartz glass; and the nanostructures are made of one or more of silicon nitride, titanium oxide, gallium nitride, aluminum oxide and silicon dioxide.

14. The large-aperture achromatic metalens according to claim 1, wherein the substrate is made of quartz glass; or the nanostructures are made of one or more of silicon nitride, titanium oxide, gallium nitride, aluminum oxide and silicon dioxide.

15. The large-aperture achromatic metalens according to claim 12, wherein the first antireflection film dedicated to the visible light band matches with an effective refractive index of quartz glass; and the second antireflection film dedicated to the visible light band matches with an effective refractive index of the nanostructures.

16. The large-aperture achromatic metalens according to claim 12, wherein the first antireflection film dedicated to the visible light band matches with an effective refractive index of quartz glass; or the second antireflection film dedicated to the visible light band matches with an effective refractive index of the nanostructures.

17. The large-aperture achromatic metalens according to claim 1, wherein another surface of the substrate is coated with a first antireflection film dedicated to an infrared light band, and the metalens surface is coated with a second antireflection film dedicated to the infrared light band; wherein the substrate and the nanostructures are both made of crystalline silicon, the first antireflection film dedicated to the infrared light band and the second antireflection film dedicated to the infrared light band both matches with an effective refractive index of crystalline silicon.

18. The large-aperture achromatic metalens according to claim 1, wherein the substrate and the nanostructures are made of one or more of crystalline silicon, crystalline germanium, selenium sulfide, zinc sulfide, and sulfur-based glass.

\* \* \* \* \*